United States Patent
Zhao et al.

(10) Patent No.: US 10,954,375 B2
(45) Date of Patent: Mar. 23, 2021

(54) MULTIFUNCTIONAL BONDING OF HYDROGELS

(71) Applicant: MASSACHUSETTS INSTITUTE OF TECHNOLOGY, Cambridge, MA (US)

(72) Inventors: Xuanhe Zhao, Cambridge, MA (US); Shaoting Lin, Cambridge, MA (US); Hyunwoo Yuk, Cambridge, MA (US); Teng Zhang, Cambridge, MA (US); German A P Hernandez, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 865 days.

(21) Appl. No.: 15/172,131

(22) Filed: Jun. 2, 2016

(65) Prior Publication Data

US 2017/0226339 A1   Aug. 10, 2017

Related U.S. Application Data

(60) Provisional application No. 62/170,639, filed on Jun. 3, 2015.

(51) Int. Cl.
| | |
|---|---|
| C08L 33/26 | (2006.01) |
| C09D 201/02 | (2006.01) |
| B32B 27/04 | (2006.01) |
| B32B 27/30 | (2006.01) |
| B05D 3/04 | (2006.01) |
| B05D 3/10 | (2006.01) |
| C08L 35/00 | (2006.01) |
| C09D 133/26 | (2006.01) |
| C09D 135/00 | (2006.01) |
| C09J 133/26 | (2006.01) |
| C09J 135/00 | (2006.01) |
| H01B 1/12 | (2006.01) |

(52) U.S. Cl.
CPC .............. *C08L 33/26* (2013.01); *B05D 3/044* (2013.01); *B05D 3/10* (2013.01); *B32B 27/04* (2013.01); *B32B 27/308* (2013.01); *C08L 35/00* (2013.01); *C09D 133/26* (2013.01); *C09D 135/00* (2013.01); *C09D 201/02* (2013.01); *C09J 133/26* (2013.01); *C09J 135/00* (2013.01); *H01B 1/122* (2013.01); *C08L 2205/04* (2013.01)

(58) Field of Classification Search
CPC .... A61K 31/137; A61K 9/0075; B05D 3/044; B05D 3/10; B32B 27/04; B32B 27/308; C08L 2205/04; C08L 33/26; C08L 35/00; C09D 133/26; C09D 135/00; C09D 201/02; C09J 133/26; C09J 135/00; H01B 1/122

See application file for complete search history.

(56) References Cited

U.S. PATENT DOCUMENTS

| | | | |
|---|---|---|---|
| 9,387,276 B2 | 7/2016 | Sun et al. | |
| 2007/0179605 A1* | 8/2007 | Myung | A61F 2/14 623/5.16 |
| 2008/0076189 A1 | 3/2008 | Belosludtsev et al. | |
| 2008/0241214 A1* | 10/2008 | Myung | A61L 27/06 424/423 |
| 2010/0330025 A1* | 12/2010 | Messersmith | A61L 27/50 424/78.17 |
| 2015/0038613 A1* | 2/2015 | Sun | A61L 27/48 523/113 |

FOREIGN PATENT DOCUMENTS

| | | |
|---|---|---|
| EP | 19970921268 | 4/1997 |
| WO | 97/38801 | 10/1997 |
| WO | 2008/097616 A1 | 8/2008 |

OTHER PUBLICATIONS

International Search Report dated Feb. 3, 2017, issued in International Application No. PCT/US2016/035600.
Written Opinion of the International Searching Authority dated Feb. 3, 2017, issued in International Application No. PCT/US2016/035600.
Notification of Transmittal of The International Search Report and The Written Opinion of the International Searching Authority, or The Declaration dated Feb. 3, 2017, issued in International Application No. PCT/US2016/035600.
Hongbin Zhang et al: "Fabrication of Robust Hydrogel Coatings on Polydimethylsiloxane Substrates Using Micropillar Anchor Structures with Chemical Surface Modification", ACS Applied Materials and Interfaces, vol. 6, No. 12, Jun. 25, 2014 (Jun. 25, 2014), pp. 9126-9133, XP055339039, US ISSN: 1944-8244, DOI: 10.1021/am501167x p. 9128, left-hand column, paragraph 1.
Peppas, N. A., Hilt, J. Z., Khademhosseini, A. & Langer, R. Hydrogels in biology and medicine: from molecular principles to bionanotechnology. Advanced Materials 18, 1345-1360 (2006).
Lee, K. Y. & Mooney, D. J. Hydrogels for tissue engineering. Chemical reviews 101, 1869-1880 (2001).

(Continued)

*Primary Examiner* — Ling Siu Choi
*Assistant Examiner* — Gennadiy Mesh
(74) *Attorney, Agent, or Firm* — Peter A. Nieves; Sheehan Phinney Bass & Green PA

(57) ABSTRACT

A robust hydrogel-solid hybrid formed of a substrate material having a nonporous and non-topographically patterned surface and a tough hydrogel bonded to the surface, the tough hydrogel having over 90 wt % water, and the hydrogel being bonded to provide interfacial toughness over 300 $Jm^{-2}$, and even over 1000 $Jm^{-2}$. The hydrogel is formed of polyacrylamide or polyethylene glycol diacrylate, which provide long-chain polymer networks, and chitosan, hyaluronan, or alginate, which provide mechanically dissipative components. An anchor, which can be a silane, a sulfide, or an amine, is disposed between the surface and the hydrogel to provide chemical bonding between the surface and the long-chain networks of the hydrogel.

8 Claims, 28 Drawing Sheets

(56) References Cited

OTHER PUBLICATIONS

Sidorenko, A. Krupenkin, T., Taylor, A., Fratzl, P. & Aizenberg, J. Reversible switching of hydrogel-actuated nanostructures into complex micropatterns. Science 315, 487-490 (2007).
Banerjee, I., Pangule, R. C. & Kane, R. S. Antifouling coatings: recent developments in the design of surfaces that prevent fouling by proteins, bacteria, and marine organisms. Advanced Materials 23, 690-718 (2011).
Dong, L., Agarwal, A. K., Beebe, D. J. & Jiang, H. Adaptive liquid microlenses activated by stimuli-responsive hydrogels. Nature 442, 551-554 (2006).
Beebe, D. J. et al. Functional hydrogel structures for autonomous flow control inside microfluidic channels. Nature 404, 588-590 (2000).
Keplinger, C. et al. Stretchable, transparent, ionic conductors. Science 341, 984-987 (2013).
Yu, C. et al. Electronically Programmable, Reversible Shape Change in Two-and Three-Dimensional Hydrogel Structures. Advanced Materials 25, 1541-1546 (2013).
Kurokawa, T., Furukawa, H., Wang, W., Tanaka, Y. & Gong, J. P. Formation of a strong hydrogel-porous solid interface via the double-network principle. Acta biomaterialia 6, 1353-1359 (2010).
Bobyn, J., Wilson, G., MacGregor, D., Pilliar, R. & Weatherly, G. Effect of pore size on the peel strength of attachment of fibrous tissue to porous-surfaced implants. Journal of biomedical materials research 16, 571-584 (1982).
Moretti, M. et al. Structural characterization and reliable biomechnical assessment of integrative cartilage repair. Journal of biomechanics 38, 1846-1854 (2005).
Gong, J. P., Katsuyama, Y., Kurokawa, T. & Osada, Y. Double-network hydrogels with extremely high mechanical strength. Advanced Materials 15, 1155 (2003).
Sun, J.-Y. et al. Highly stretchable and tough hydrogels. Nature 489, 133-136(2012).
Sun, T. L. et al. Physical hydrogels composed of polyampholytes demonstrate high toughness and viscoelasticity. Nat Mater 12, 932 (2013).
Kamata, H., Akagi, Y., Kayasuga-Kariya, Y., Chung, U.-i, & Sakai, T. "Nonswellable" Hydrogel Without Mechanical Hysteresis. Science 343, 873-875 (2014).
Wang, Q. et al. High-water-content mouldable hydrogels by mixing clay and a dendritic molecular binder. Nature 463, 339-343 (2010).
Liu, M. et al. An anisotropic hydrogel with electrostatic repulsion between cofacially aligned nanosheets. Nature 517, 68-72 (2015).
Yoshida, W., Castro, R. P., Jou, J.-D. & Cohen, Y. Multilayer alkoxysilane silylation of oxide surfaces. Langmuir : the ACS journal of surfaces and colloids 17, 5882-5888 (2001).
Gong, J. P. Why are double network hydrogels so tough?Soft Matter 6, 2583-2590 (2010).
Zhao, X. Multi-scale multi-mechanism design on tough hydrogels: building dissipation into stretchy networks. Soft Matter 10, 672-687 (2014).
Lake, G. J. & Thomas, A. G. Strength of Highly Elastic Materials. Proceedings of the Royal Society of London Series a-Mathematical and Physical Sciences 300, 108 (1967).
Webber, R. E., Creton, C., Brown, H. R. & Gong, J. P. Large strain hysteresis and mullins effect of tough double-network hydrogels, Macromolecules 40, 2919-2927 (2007).
Kendall, K. Thin-film peeling-the elastic term. Journal of Physics D: Applied Physics 8, 1449 (1975).
Ghatak, A., Chaudhury, M. K., Shenoy, V. & Sharma, A. Meniscus instability in a thin elastic film. Physical Rewiew Letters 85, 4329 (2000).
Biggins, J. S., Saintyves, B., Wei, Z., Bouchaud, E. & Mahadevan, L. Digital instability of a confined elastic meniscus. Proceedings of the National Academy of Sciences 110, 12545-12548 (2013).
Ogden, R. & Roxburgh, D. A pseudo-elastic model for the Mullins effect in filled rubber. Proceedings of the Royal Society of London. Series A: Mathematical, Physical and Engineering Sciences 455, 2861-2877 (1999).
Dugas, V. & Chevalier, Y. Surface hydroxylation and silane grafting on fumed and thermal silica. Journal of colloid and interface science 264, 354-361 (2003).
Hacking, S., Bobyn, J., Toh, K., Tanzer, M. & Krygier, J. Fibrous tissue ingrowth and attachment to porous tantalum. Journal of biomedical materials research 52, 631-638 (2000).
Rose, S. et al. Nanoparticle solutions as adhesives for gels and biological tissues. Nature 505, 382-385, doi:10.1038/nature12806 (2014).
Bundy, K., Schlegel, U., Rahn, B., Geret, V. & Perren, S. An improved peel test method for measurement of adhesion to biomaterials. Journal of Materials Science: Materials in Medicine 11, 517-521 (2000).
Lin, Q. et al. Adhesion mechanisms of the mussel foot proteins mfp-1 and mfp-3. Proceedings of the National Academy of Sciences 104, 3782-3786 (2007).
Murphy, J. L., Vollenweider, L., Xu, F. & Lee, B. P. Adhesive performance of biomimetic adhesive-coated biologic scaffolds. Biomacromolecules 11, 2976-2984 (2010).
Guvendiren, M., Messersmith, P. B. & Shull, K. R. Self-assembly and adhesion of DOPA-modified methacrylic triblock hydrogels. Biomacromolecules 9, 122-128 (2007).
Sofla, A., Seker, E., Landers, J. P. & Begley, M. R. PDMS-glass interface adhesion energy determined via comprehensive solutions for thin film bulge/blister tests. Journal of Applied Mechanics 77, 031007 (2010).
Shull, K. R., Ahn, D., Chen, W. L., Flanigan, C. M. & Crosby, A. J. Axisymmetric adhesion tests of soft materials. Macromolecular Chemistry and Physics 199, 489-511 (1998).
Jang, E.-J. et al. Effect of surface treatments on interfacial adhesion energy between UV-curable resist and glass wafer. International Journal of Adhesion and Adhesives 29, 662-669 (2009).
Toonder, J. D., Malzbender, J. & Balkenende, R. Fracture toughness and adhesion energy of sol-gel coatings on glass. Journal of materials research 17, 224-233 (2002).
Li, L., Tirrell, M., Korba, G. A. & Pocius, A. V. Surface energy and adhesion studies on acrylic pressure sensitive adhesives. The Journal of Adhesion 76, 307-334 (2001).
Muir, B, V., Myung. D., Knoll, W. & Frank, C. W. Grafting of cross-linked hydrogel networks to titanium surfaces. ACS Appl Mater Interfaces 6, 958-966, doi:10.1021/am404361v (2014).
Lin, S., Zhou, Y. & Zhao, X. Designing extremely resilient and tough hydrogels via delayed dissipation. Extreme Mechanics Letters 1, 70 (2014).

* cited by examiner

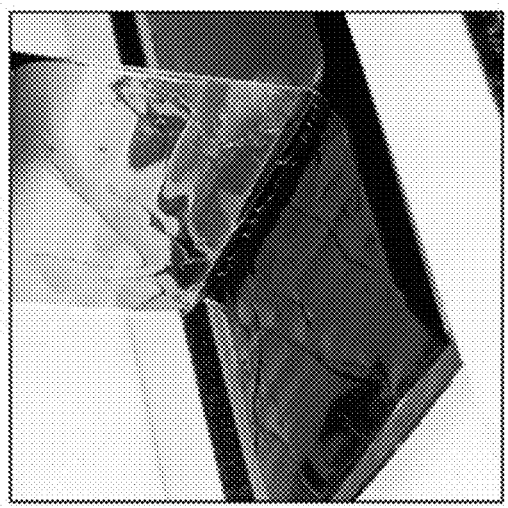
FIG. 2E Steady-state
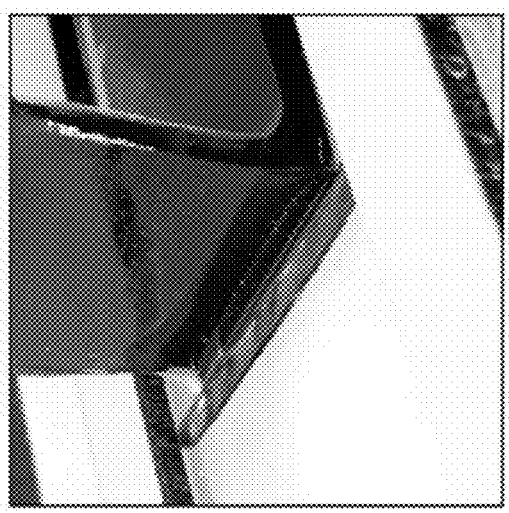
FIG. 2D Crack initiation
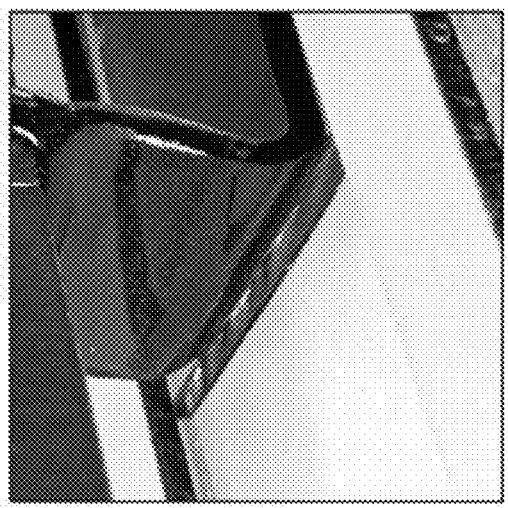
FIG. 2C No force

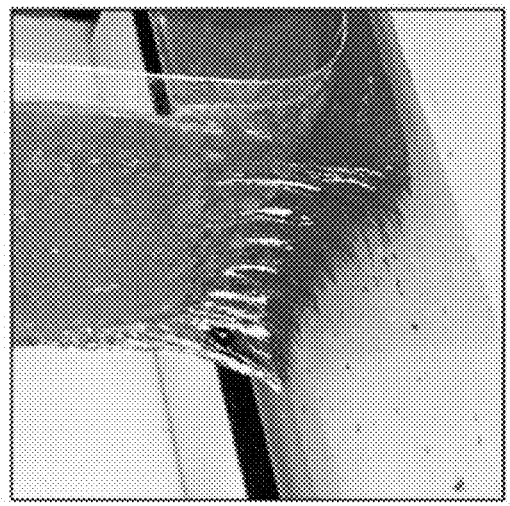
FIG. 2H Steady-state
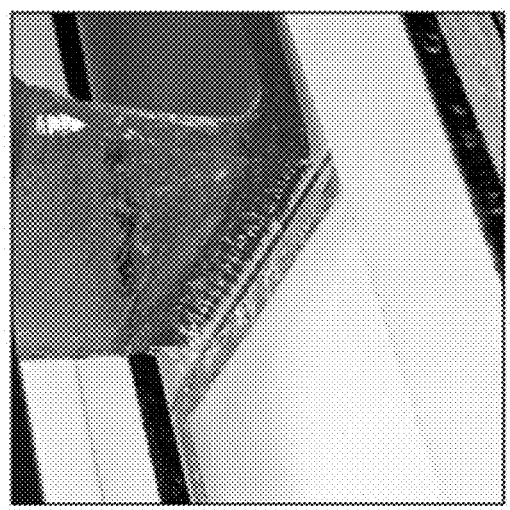
FIG. 2G Crack initiation
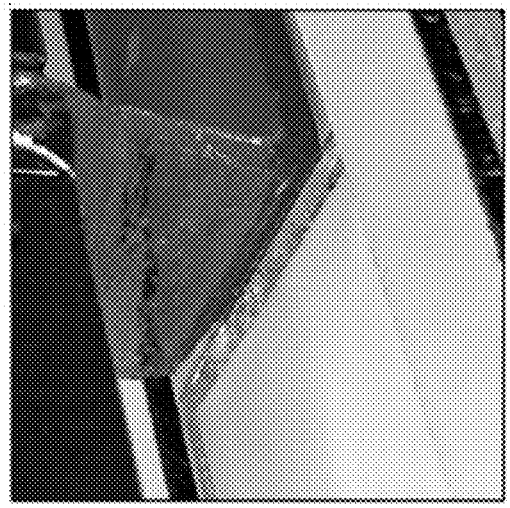
FIG. 2F No force

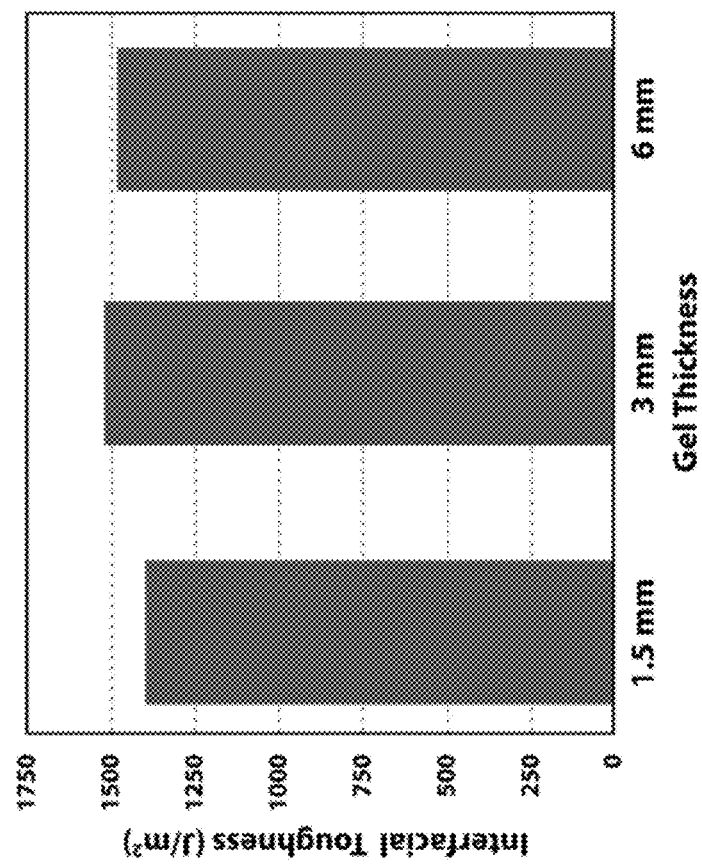
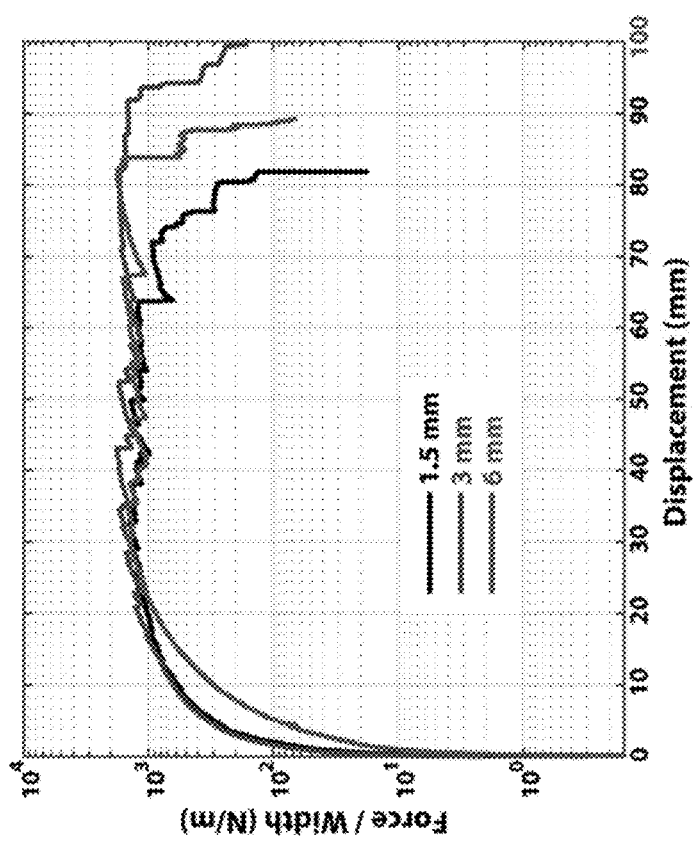
FIG. 8A
FIG. 8B

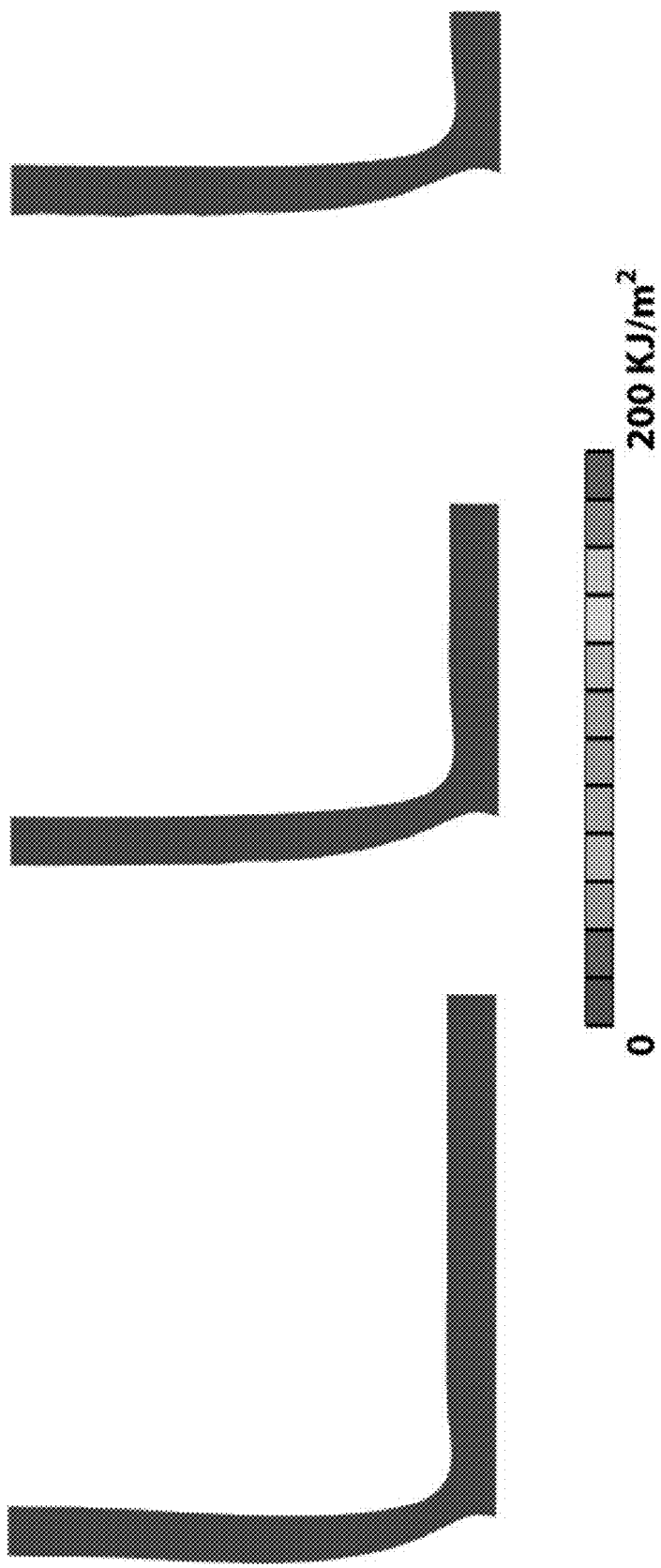

MULTIFUNCTIONAL BONDING OF HYDROGELS

PRIORITY CLAIM

This application claims priority to U.S. Provisional Patent No. 62/170,639, filed Jun. 3, 2015, which is incorporated by reference in its entirety.

STATEMENT REGARDING FEDERALLY SPONSORED RESEARCH OR DEVELOPMENT

This invention was made with Government support under Grant No. N00014-14-1-0619 awarded by the Office of Naval Research. The Government has certain rights in the invention.

TECHNICAL FIELD

This invention relates to bonding of hydrogels to a solid substrate.

BACKGROUND

Hybrid combinations of hydrogels and solid materials including metals, ceramics, glass, silicon and polymers are used in areas as diverse as biomedicine, adaptive and responsive materials, antifouling, actuators for optics and fluidics, and soft electronics and machines. See, Peppas, N. A., Hilt, J. Z., Khademhosseini, A. & Langer, R. Hydrogels in biology and medicine: from molecular principles to bionanotechnology. *Advanced Materials* 18, 1345-1360 (2006), Lee, K. Y. & Mooney, D. J. Hydrogels for tissue engineering. *Chemical reviews* 101, 1869-1880 (2001), Sidorenko, A., Krupenkin, T., Taylor, A., Fratzl, P. & Aizenberg, J. Reversible switching of hydrogel-actuated nanostructures into complex micropatterns. *Science* 315, 487-490 (2007), Banerjee, I., Pangule, R. C. & Kane, R. S. Antifouling coatings: recent developments in the design of surfaces that prevent fouling by proteins, bacteria, and marine organisms. *Advanced Materials* 23,690-718 (2011), Dong, L., Agarwal, A. K., Beebe, D. J. & Jiang, H. Adaptive liquid microlenses activated by stimuli-responsive hydrogels. *Nature* 442, 551-554 (2006), Beebe, D. J. et al. Functional hydrogel structures for autonomous flow control inside microfluidic channels. *Nature* 404, 588-590 (2000), Keplinger, C. et al. Stretchable, transparent, ionic conductors. *Science* 341, 984-987 (2013), and Yu, C. el al. Electronically Programmable, Reversible Shape Change in Two- and Three-Dimensional Hydrogel Structures. *Advanced Materials* 25, 1541-1546 (2013), each of which is incorporated by reference in its entirety. Although hydrogels with extraordinary physical properties have been recently developed, the weak and brittle bonding between hydrogels and solid materials often severely hampers their integrations and functions in devices and systems. Whereas intense efforts have been devoted to the development of tough hydrogel-solid interfaces, previous works are generally limited to special cases with porous solid substrates. See Kurokawa, T., Furukawa, H., Wang, W., Tanaka, Y. & Gong, J. P. Formation of a strong hydrogel-porous solid interface via the double-network principle. *Acta biomaterialia* 6, 1353-1359 (2010), which is incorporated by reference in its entirety. The need for general strategies and practical methods for the design and fabrication of tough hydrogel bonding to diverse solid materials has remained a central challenge for the field.

SUMMARY

In general, a toughened hydrogel-modified surface can be made through surface modification with selected anchor materials. An article can include a substrate, an anchor, and a hydrogel, wherein the anchor is positioned between the substrate and the hydrogel and bonds the substrate via chemical bonds. In certain embodiments, long-chain polymer networks can interpenetrate the hydrogel. In other embodiments, the long-chain polymer networks can be crosslinked. In other embodiments, the long-chain polymer networks can be chemically bonded to the anchor.

In certain embodiments, the anchor can include a functional silane. The functional silanes can be covalently grafted on the substrate. For example, the functional silane can be 3-(Trimethoxysilyl) Propyl Methacrylate (TMSPMA). The hydrogel can include chitosan, hyaluronan, or alginate. The long-chain polymer networks can include polyacrylamide or polyethylene glycol diacrylate.

In certain embodiments, the substrate can be nonporous. For example, the substrate can include glass, silicon, ceramic, aluminum or titanium. In certain other embodiments, the hydrogel can include more than 90% of water.

A method of bonding a hydrogel to a solid substrate can include grafting an anchor to the substrate, chemically bonding long-chain polymer networks to the anchor, and contacting the substrate with a hydrogel precursor solution. In certain embodiments, the anchor can include functional silanes. The functional silanes can be covalently grafted on the substrate. For example, the functional silane can be 3-(Trimethoxysilyl) Propyl Methacrylate (TMSPMA). The hydrogel can include chitosan, hyaluronan, or alginate. The long-chain polymer networks can include polyacrylamide or polyethylene glycol diacrylate. In certain embodiments, the substrate can be nonporous. For example, the substrate can include glass, silicon, ceramic, aluminum or titanium. In certain other embodiments, the hydrogel can include more than 90% of water.

A method of bonding a hydrogel to a solid substrate can include grafting functional silanes on the substrate via covalent bonds, chemically bonding long-chain polymer networks to the functional silanes, and contacting the substrate with a hydrogel precursor solution. In certain embodiments, the method can further comprise exposing the substrate to an oxygen environment before grafting functional silanes on the substrate. In certain embodiments, the chemical bonding can include covalent crosslinking. The functional silanes can be covalently grafted on the substrate. For example, the functional silane can be 3-(Trimethoxysilyl) Propyl Methacrylate (TMSPMA). The hydrogel can include chitosan, hyaluronan, or alginate. The long-chain polymer networks can include polyacrylamide or polyethylene glycol diacrylate. In certain embodiments, the substrate can be nonporous. For example, the substrate can include glass, silicon, ceramic, aluminum or titanium. In certain other embodiments, the hydrogel can include more than 90% of water.

Other aspects, embodiments, and features will be apparent from the following description, the drawings, and the claims.

BRIEF DESCRIPTION OF THE DRAWINGS

FIGS. 2A-2J show experimental and modeling results on various types of hydrogel-solid bonding.

FIGS. 8A-8B show Interfacial toughness of PAAm-alginate hydrogels with different thicknesses chemically anchored on glass substrates.

FIGS. 18A-18F show snapshots of the simulations of the peeling tests.

DETAILED DESCRIPTION

Figure 1A:
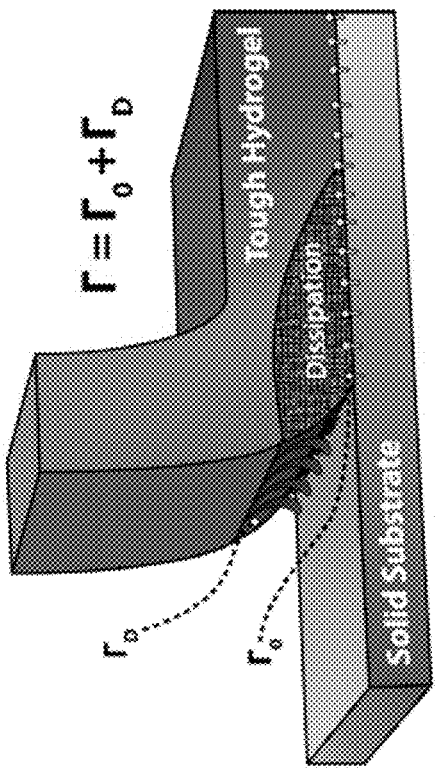
FIGS. 1A-1C show a general design strategy for tough bonding of hydrogels to diverse solids.

How to design interfacial bonding between synthetic hydrogels and nonporous solid materials to be tougher than their natural counterparts such as tendons or cartilages on bones has been a long-lasting grand challenge in materials science and soft-matter physics. Such tough bonding will find critical applications in areas as diverse as biomedicine, adaptive and responsive materials, antifouling, actuators for optics and fluidics, and soft electronics and machines. However, despite recent developments of hydrogels with extraordinary physical properties, the bonding of synthetic hydrogels to nonporous solids is still very weak and brittle—much lower than the interfacial toughness of tendons or cartilages on bones (i.e., ~800 Jm$^{-2}$). The need for general strategies and practical methods for the design and fabrication of tough bonding of hydrogels to diverse solid materials has remained a grand and fundamental challenge for the field.

Whereas the bonding of tendons and cartilages to bones is extremely tough in many animals (e.g., interfacial toughness ~800 Jm$^{-2}$), such tough interfaces have not been achieved between synthetic hydrogels and nonporous surfaces of engineering solids. See, Bobyn, J., Wilson, G., MacGregor, D., Pilliar, R. & Weatherly, G. Effect of pore size on the peel strength of attachment of fibrous tissue to porous-surfaced implants. *Journal of biomedical materials research* 16, 571-584 (1982), Moretti, M. el al. Structural characterization and reliable biomechanical assessment of integrative cartilage repair. *Journal of biomechanics* 38, 1846-1854 (2005), Gong, J. P., Katsuyama, Y., Kurokawa, T. & Osada, Y. Double-network hydrogels with extremely high mechanical strength. *Advanced Materials* 15, 1155 (2003), Sun, J.-Y. et al. Highly stretchable and tough hydrogels. *Nature* 489, 133-136(2012), Sun, T. L. el al. Physical hydrogels composed of polyampholytes demonstrate high toughness and viscoelasticity. *Nat Mater* 12, 932 (2013), Kamata, H., Akagi, Y., Kayasuga-Kariya, Y., Chung, U.-i. & Sakai, T. "Nonswellable" Hydrogel Without Mechanical Hysteresis. *Science* 343, 873-875 (2014), Wang, Q. et al. High-water-content mouldable hydrogels by mixing clay and a dendritic molecular binder. *Nature* 463, 339-343 (2010), and Liu, M. el al. An anisotropic hydrogel with electrostatic repulsion between cofacially aligned nanosheets. *Nature* 517, 68-72 (2015), each of which is incorporated by reference in its entirety.

Disclosed herein is a general strategy and a simple method to design transparent and conductive bonding of synthetic hydrogels with over 90 wt % water to nonporous surfaces of diverse solids including glass, silicon, ceramics, titanium and aluminum, achieving interfacial toughness over 1000 Jm$^{-2}$-superior to their natural counterparts. This method shows the tough synthetic bonding that relies on a synergistic integration of moderate intrinsic interfacial work of adhesion and significant mechanical dissipation in the hydrogel during detachment. This method also demonstrates applications of robust hydrogel-solid hybrids including hydrogel superglues, hydrogel coatings that are mechanically protective, hydrogel joints for robotic structures, and robust hydrogel-metal conductors.

This design strategy relies on a synergistic integration of moderate intrinsic work of adhesion on the interfaces and significant mechanical dissipation in the hydrogels during detachment. The fabrication method does not require porous or topographically patterned surfaces of the solids and allows the hydrogels to contain over 90 wt % of water. The resultant tough bonding is optically transparent and electrically conductive. In addition, functions of hydrogel-solid hybrids uniquely enabled by the tough bonding including tough hydrogel superglues, hydrogel coatings are mechanically protective, hydrogel joints for robotic structures, and robust hydrogel-metal conductors. The general strategy and simple yet versatile method opens new avenues not only to addressing fundamental questions on hydrogel-solid interfaces in biology, physics, chemistry and material science but also to practical applications of robust hydrogel-solid hybrids in diverse areas.

A method of bonding a hydrogel with a solid substrate can include grafting an anchor to the substrate, chemically bonding long-chain polymer networks to the anchor; and contacting the substrate with a hydrogel precursor solution. In certain embodiment, the method can further comprise exposing the substrate to an oxygen environment before grafting the anchor on the substrate.

An article can include a substrate, an anchor, and a hydrogel where the anchor bonds the substrate via chemical bonds. In certain embodiments, long-chain polymer networks interpenetrate the hydrogel resulting in tough hydrogel. The long-chain polymer networks can be crosslinked. In certain embodiments, the long-chain polymer networks can be chemically bonded to the anchor.

The anchor includes chemical moieties that can bond long-chain polymer networks inside a tough hydrogel to a substrate. For examples, the anchor can include a silane, a sulfide, or an amine. Specifically, silanes with methacrylate functional terminal can be used to anchor hydrogel polymers with acrylates. Other types silanes with other terminal groups can be used for corresponding hydrogel polymers. When using precious metals such as gold as a substrate, bis(2-methacryloyl)oxyethyl disulfide or other similar chemicals can be used to anchor hydrogel polymers via thiol chemistry. Alternatively, amine-carboxyl conjugation chemicals such as N-hydroxysuccinimide (NHS) and 1-ethyl-3-(3-dimethylaminopropyl) carbodiimide (EDC) can be used to chemically anchor hydrogel polymers. Herein hydrogel polymers represent polymers that interpenetrate a hydrogel.

The chemical bonding can include covalent crosslinking of a polymer with a surface moiety.

The substrate can be nonporous. For example, the substrate can include glass, silicon, ceramic, aluminum or titanium. In certain embodiment, the substrate can include precious metals, such as gold.

The hydrogel can contain biopolymers such as chitosan, hyaluronan, or alginate.

The long-chain polymer networks can be synthesized from a monomer or a macromonomer with a functional group corresponding to the anchor on the substrate. For example, the long-chain polymer networks can be synthesized from a monomer or a macromonomer with acrylate functional groups, such as acrylamide or polyethylene glycol diacrylate.

Figure 1B:
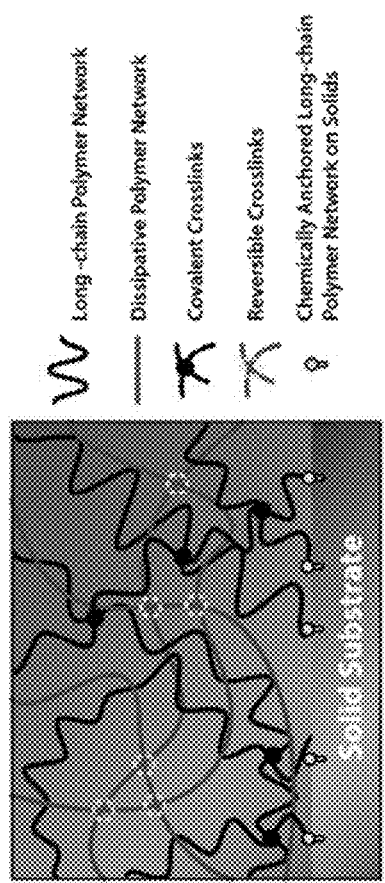
Figure 1C:
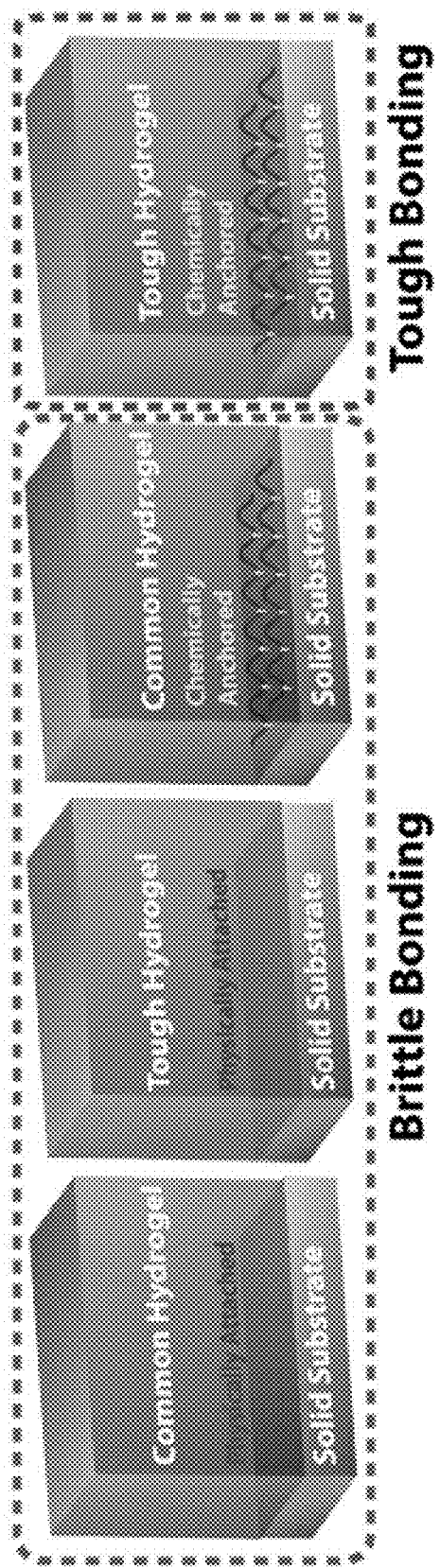

The disclosed strategy to design tough hydrogel-solid bonding is illustrated in FIG. 1. FIG. 1A shows the tough bonding first requires high fracture toughness of constituent hydrogels. Whereas tough hydrogels generally consist of long-chain polymer networks and mechanically dissipative components, it is sufficient to achieve tough bonding by chemically anchoring only the long-chain networks on solid surfaces. FIG. 1B shows the chemical anchoring gives a relatively high intrinsic work of adhesion $\Gamma_0$, which maintains cohesion of the hydrogel-solid interface and allows large deformation and mechanical dissipation to be developed in the hydrogel during detachment. The dissipation further contributes to the total interfacial toughness by $\Gamma_D$. FIG. 1C shows schematics of various types of hydrogel-solid interfaces to be tested in the current study to validate the proposed design strategy (from left to right): common and tough hydrogels physically attached on solids, and common and tough hydrogels chemically anchored on solids.

Since interfacial cracks can kink and propagate in relatively brittle hydrogel matrices, the design of tough hydrogel-solid bonding first requires high fracture toughness of the constituent hydrogels. See, Kurokawa, T., Furukawa, H., Wang, W., Tanaka, Y. & Gong, J. P. Formation of a strong hydrogel-porous solid interface via the double-network principle. *Acta biomoterialia* 6, 1353-1359 (2010), which is incorporated by reference in its entirety. Whereas tough hydrogels generally consist of long-chain polymer networks that are highly stretchable and other components that dissipate mechanical energy under deformation (see, Gong, J. P. Why are double network hydrogels so tough? *Soft Matter* 6, 2583-2590 (2010) and Zhao, X. Multi-scale multi-mechanism design of tough hydrogels: building dissipation into stretchy networks. *Soft Matter* 10, 672-687 (2014), each of which is incorporated by reference in its entirety), it is impractical to chemically bond all components of the hydrogels on solid surfaces. It is sufficient to achieve relatively tough hydrogel-solid bonding by chemically anchoring only the long-chain polymer network of a tough hydrogel on solid surfaces as illustrated in FIG. 1A. When such a chemically-anchored tough hydrogel is detached from a solid, scission of the anchored layer of polymer chains gives the intrinsic work of adhesion $\Gamma_0$ (see Lake, G. J. & Thomas, A. G. STRENGTH OF HIGHLY ELASTIC MATERIALS. *Proceedings of the Royal Society of London Series a-Mathematical and Physical Sciences* 300, 108 (1967), which is incorporated by reference in its entirety) (FIG. 1B). Meanwhile, the hydrogel around the interface will be highly deformed and thus dissipate a significant amount of mechanical energy, which further contributes to the interfacial toughness by $\Gamma_D$ (FIG. 1B). See Webber, R. E., Creton, C., Brown, H. R. & Gong, J. P. Large strain hysteresis and mullins effect of tough double-network hydrogels. *Macromolecules* 40, 2919-2927 (2007), which is incorporated by reference in its entirety. Neglecting contributions from mechanical dissipation in the solid and friction on the interface, the total interfacial toughness of the hydrogel-solid bonding is expressed as $$\Gamma = \Gamma_o + \Gamma_D \quad (1)$$

In Eq. (1), $\Gamma_o$ may be much lower than $\Gamma_D$ for tough hydrogel-solid bonding, but it is still critical to chemically anchor long-chain polymer networks of tough hydrogels on the solids surfaces. This is because the chemical anchoring gives a relatively high intrinsic work of adhesion $F_o$ (compared with physically attached cases), which maintains cohesion of the hydrogel-solid interface while allowing large deformation and mechanical dissipation to be developed in the hydrogel during the peeling process (FIG. 1B).

Figures 2A, 2B:
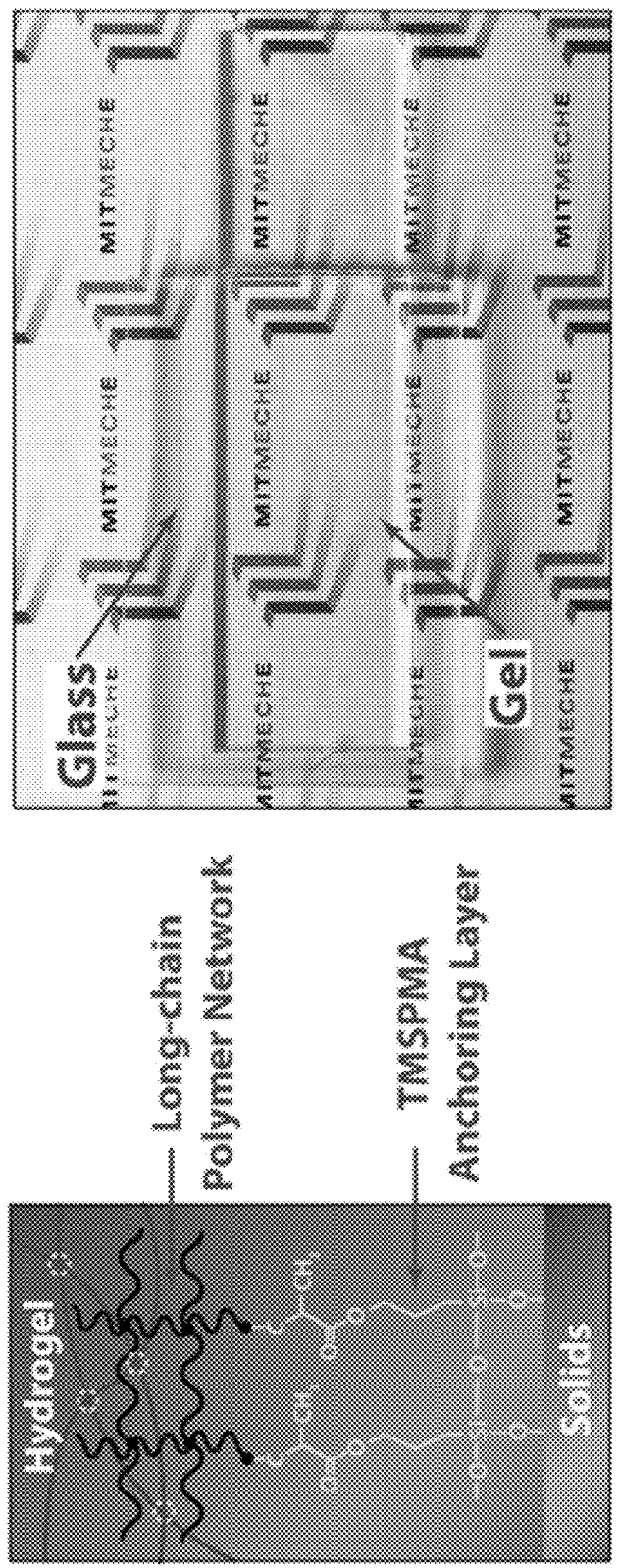
Figures 2I, 2J:
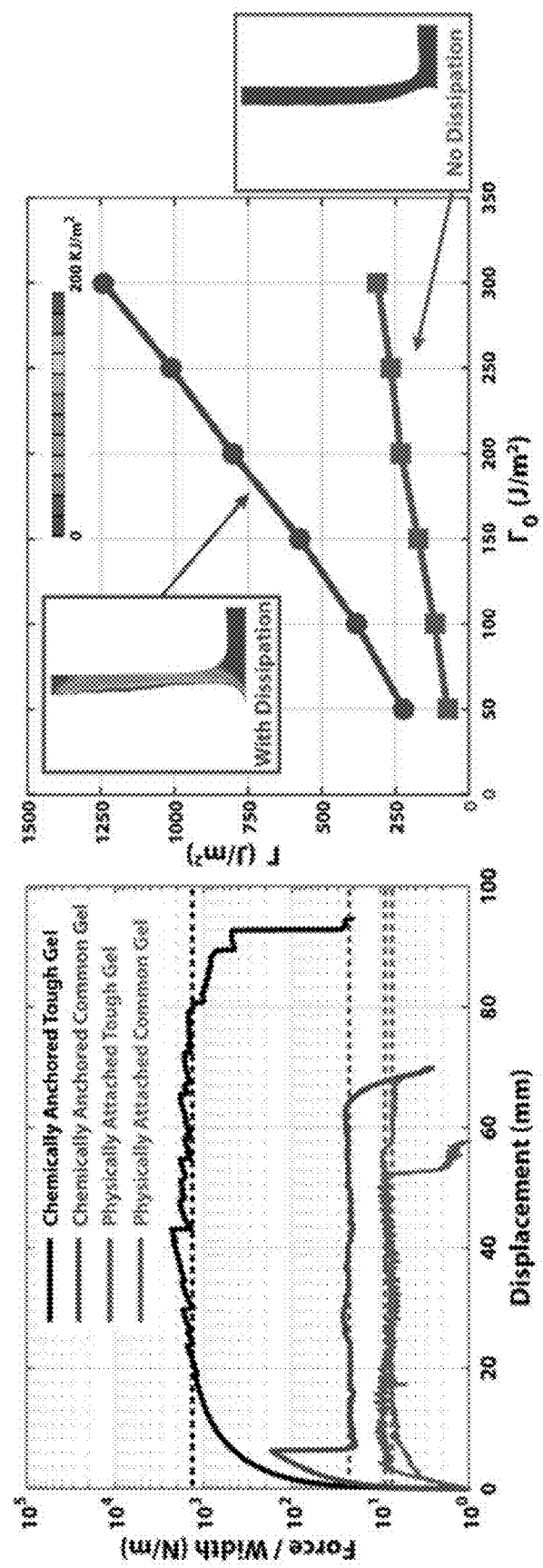
Figure 5:
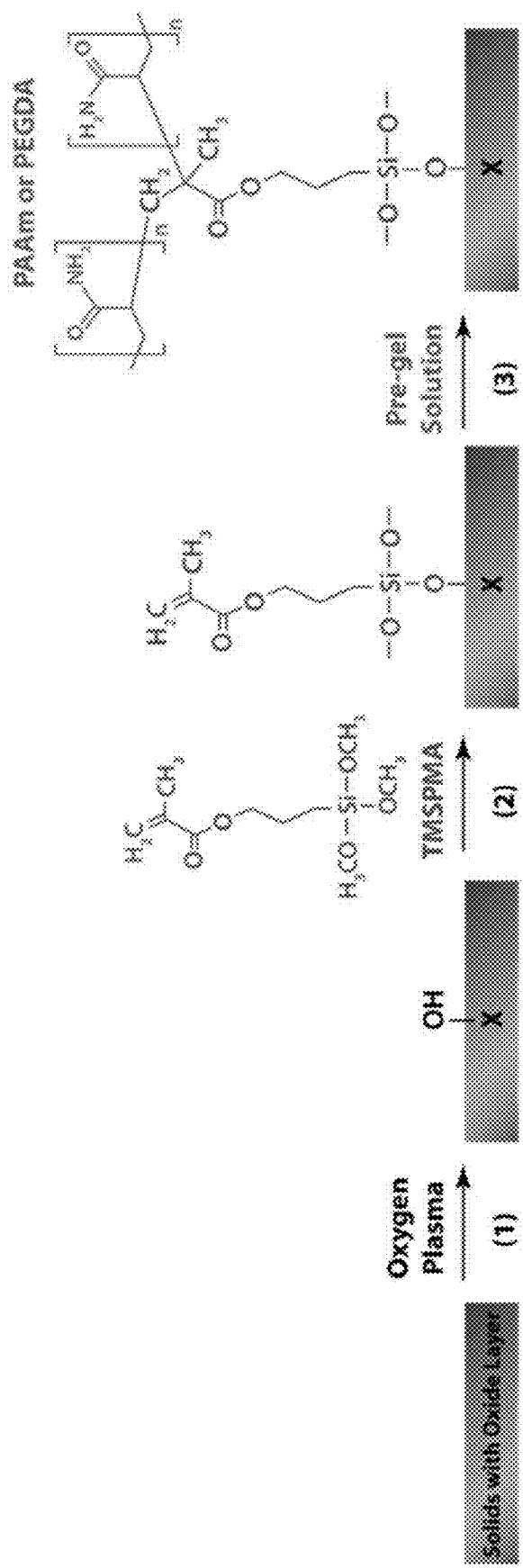
FIG. 5 shows schematic illustration of the method to chemically anchor long-chain polymer networks on various solid surfaces.

To test the proposed design strategy, a functional silane 3-(Trimethoxysilyl) Propyl Methacrylate (TMSPMA) was used to modify the surfaces of glass, silicon wafer, titanium, aluminum, and mica ceramic (FIG. 2A). See Tegelström, H. & Wyöni, P. I. Silanization of supporting glass plates avoiding fixation of polyacrylamide gels to glass cover plates. *Electrophoresis* 7, 99-99 (1986), which is incorporated by reference in its entirety. FIG. 2A shows the chemical anchoring of long-chain polymer networks is achieved by cross-linking the networks to functional silanes grafted on the surfaces of various solids. FIG. 2B shows the high transparency of the hydrogel-solid bonding is demonstrated by a colorful logo "MIT MECH" behind a hydrogel-glass hybrid. FIGS. 2C-2E show photos of the peeling process of a common hydrogel chemically anchored on a glass substrate. FIGS. 2F-2H show photos of the peeling process of a tough hydrogel with its long-chain network chemically anchored on a glass substrate. (Note that blue and red food dyes are added into the common and tough hydrogels, respectively, to enhance the contrast of the interfaces.) FIG. 2I shows the curves of peeling force per width of hydrogel sheet vs. displacement for various types of hydrogel-solid bonding. FIG. 2I shows the calculated interfacial fracture toughness ☐ as a function of the prescribed intrinsic work of adhesion $\Gamma_o$ in finite-element models for the PAAm-alginate hydrogel and a pure elastic hydrogel with no mechanical dissipation but otherwise the same properties as the PAAm-alginate hydrogel. The contours in the inset figures indicate mechanical energy dissipated per unit area. Then the long-chain polymer network of polyacrylamide (PAAm) or polyethylene glycol diacrylate (PEGDA) was covalently crosslinked to the silanes on the modified surfaces of various solids. (See Examples and FIG. 5 for details on the modification and anchoring process.) To form tough hydrogels, the long-chain polymer network is interpenetrated with a reversibly crosslinked network of alginate, chitosan or hyaluronan, in which the reversible crosslinking and chain scission dissipates mechanical energy as illustrated in FIGS. 1A-1B. As control samples, a pure PAAm or PEGDA hydrogel was chemically anchored on treated solid surfaces, and physically attach the pure PAAm or PEGDA hydrogel and corresponding tough hydrogels on untreated solid surfaces as illustrated in FIG. 1C. The shear moduli of all hydrogels are set to be on the same level, ~30 kPa, by controlling the crosslinking densities in the hydrogels.

Figure 6:
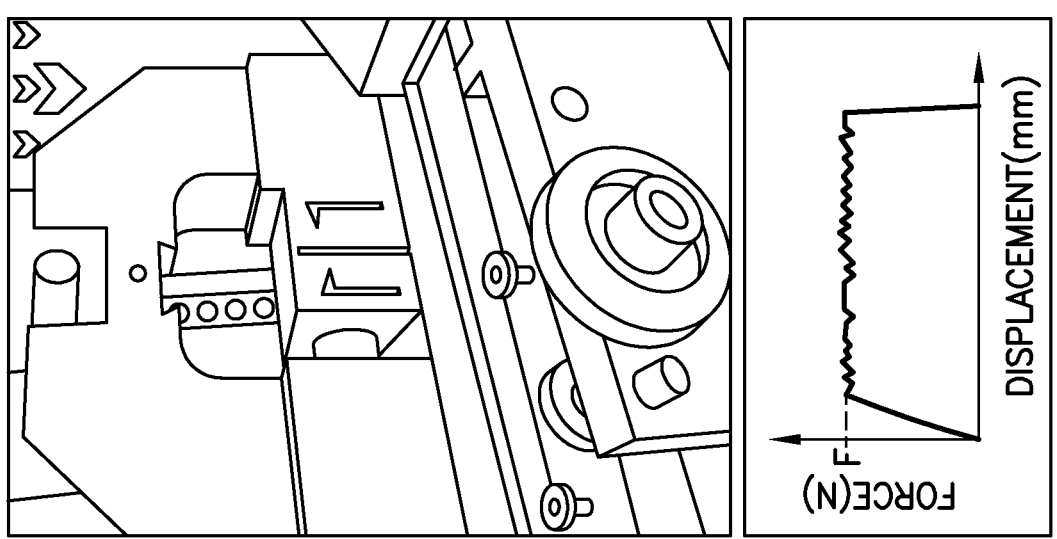
FIG. 6 shows schematics and experimental setup for the 90-degree peeling test.
Figure 6:
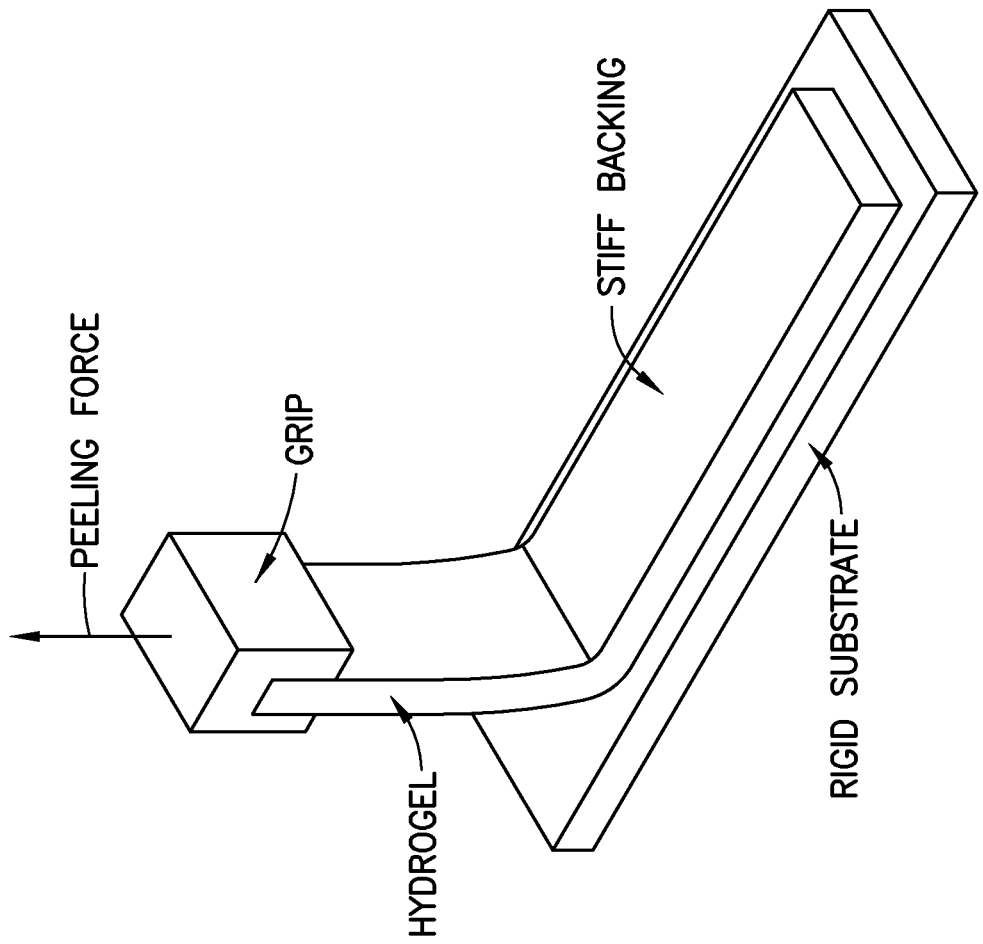
Figure 7:
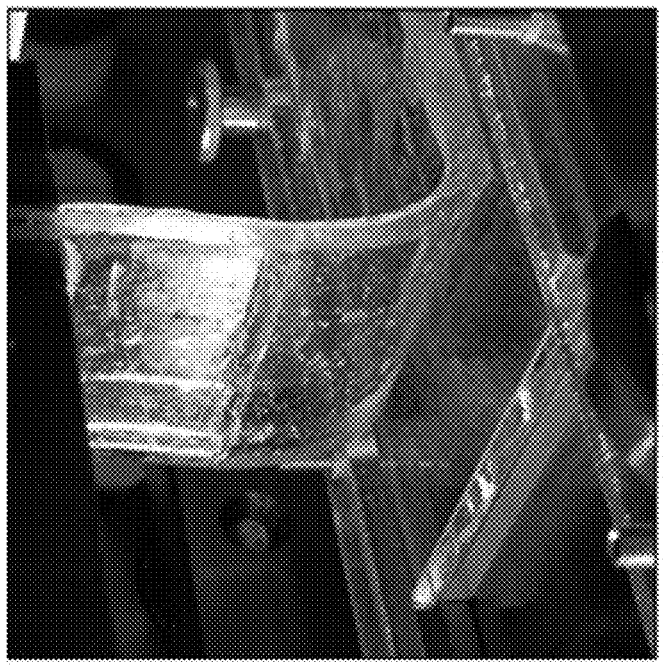
FIG. 7 shows photos of the peeling process of tough or common hydrogel physically attached on a glass substrate.
Figure 7:
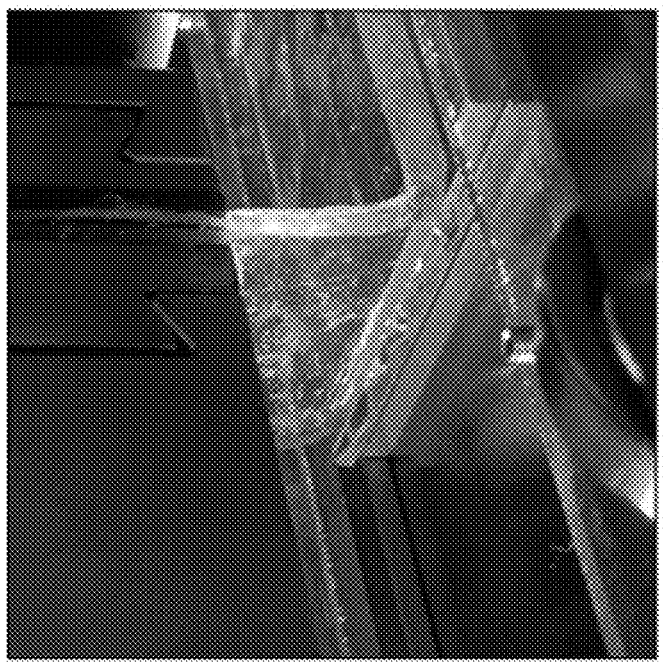

The samples of tough (PAAm-alginate) and common (PAAm) hydrogels chemically anchored and physically attached on glass substrates all look identical, as they are transparent with transmittance over 95%. The transparency of a sample is demonstrated in FIG. 2B by placing it above the "MIT MECHE" color logo. A standard 90-degree-peeling test was carried out to measure the interfacial toughness between hydrogel sheets with thickness of 3 mm and the glass substrates. A thin (~25 μm thick) and rigid glass film backing is attached to the other surface of the hydrogel sheet to prevent its elongation along the peeling direction. Thus, the measured interfacial toughness is equal to the steady-state peeling force per width of the hydrogel sheet. See Kendall, K. Thin-film peeling-the elastic term. *Journal of Physics D: Applied Physics* 8, 1449 (1975), which is incorporated by reference in its entirety. See FIG. 6 for details of the peeling test. Mechanical testing machine (Zwick/Roell Z2.5) pulled the hydrogel sheet together with stiff backing in 90 degrees from the substrate. The peeling fixture (TestResources, G50) maintained the peeling angle to be 90 degree during the test via a pulley connected to the crosshead of the machine (test standard: ASTM D 2861). The peeling test samples were prepared with 110 mm in length, 30 mm in width and 1.5-6 mm in thickness. A glass film with thickness of 25 μm was used as a stiff backing for the hydrogel. The interfacial toughness was calculated by dividing the steady-state (or plateau) peeing force with the sample width. FIGS. 2C-2E demonstrate the peeling process of the common hydrogel chemically anchored on the glass substrate. It can be seen that a crack initiates at the hydrogel-solid interface, kinks into the brittle hydrogel, and then propagates forward. The measured interfacial toughness is 24 $Jm^{-2}$ (FIG. 2I), limited by the hydrogel's fracture toughness, validating that tough hydrogels are indeed critical in the design of tough hydrogel-solid interfaces. FIG. 7 demonstrates a typical peeling process of a tough or common hydrogel physically attached on the glass substrate. The crack can easily propagate along the interface without kinking or significantly deforming the hydrogel, giving very low interfacial toughness of 8 $Jm^{-2}$. Different from the previous process in FIGS. 2C-2E, the crack can easily propagate along the interface without kinking or significantly deforming the hydrogel, giving very low interfacial toughness of 8 $Jm^{-2}$ (FIG. 2I). FIGS. 2F-2H demonstrate the peeling process of the tough hydrogel with its long-chain network chemically anchored on the glass substrate. As the peeling force increases, the hydrogel around the interfacial crack front highly deforms and subsequently becomes unstable (see Ghatak, A., Chaudhury, M. K., Shenoy, V. & Sharma, A. Meniscus instability in a thin elastic film. *Physical Review Leters* 85, 4329 (2000) and Biggins, J. S., Saintyves, B., Wei, Z., Bouchaud, E. & Mahadevan, L. Digital instability of a confined elastic meniscus. *Proceedings of the National Academy of Sciences* 110, 12545-12548 (2013), each of which is incorporated by reference in its entirety), developing a pattern of fingers before the interfacial crack can propagate. When the peeling force reaches a critical value, the crack begins to propagate along the hydrogel-solid interface (FIG. 2G). During crack propagation, the fingers coarsen with increasing amplitude and wavelength, and then detach from the substrate (FIG. 2H). The measured interfacial toughness is over 1500 $Jm^{-2}$ (FIG. 2I), superior to the natural counterparts such as tendons and cartilages on bones. The thickness of the tough hydrogel sheet was further varied from 1.5 mm to 6 mm, and obtain similar values of interfacial toughness (FIG. 8). FIG. 8A shows typical curves of the peeling force per hydrogel width vs. displacement for samples with thickness of 1.5 mm, 3 mm and 6 mm, respectively. FIG. 8B shows the measured interfacial toughness of samples with thickness of 1.5 mm, 3 mm and 6 mm, respectively. The interfacial toughness does not significantly depend on sample thickness in this range of 1.5 mm-6 mm. These results (FIGS. 2C-2I) validate the proposed design strategy that chemically anchoring only the long-chain polymer networks of tough hydrogels on solid substrates can lead to extremely tough hydrogel-solid bonding.

To further understand the interfacial toughening mechanism, a two-dimensional finite-element model was developed to simulate the peeling process of a hydrogel sheet from rigid substrate under plane-strain condition. In the model, the intrinsic work of adhesion $\Gamma_0$ is prescribed by a layer of cohesive elements and the dissipative property of the PAAm-alginate hydrogel is characterized by Mullins effect. See Ogden, R. & Roxburgh, D. A pseudo-elastic model for the Mullins effect in filled rubber. *Proceedings of the Royal Society of London. Series A: Mathematical, Physical and Engineering Sciences* 455, 2861-2877 (1999), which is incorporated by reference in its entirety. See FIGS. 13-18 for details of the model. FIG. 2J gives the relation between the prescribed intrinsic work of adhesion $\Gamma_0$ and the calculated interfacial toughness $\Gamma$. It is evident that the interfacial toughness increases monotonically with the intrinsic work of adhesion, which is effectively augmented by a factor determined by the dissipative and mechanical properties of the hydrogel. For the PAAm-alginate hydrogel used in the peeling test, the augmentation factor can reach 4. (It should be noted that the 2D finite-element model does not account for the effect of fingering instability on mechanical dissipation, which may further enhance the interfacial toughness.) The thickness of the PAAm-alginate hydrogel was also varied in the model from 0.8 mm to 6 mm and find that the calculated interfacial toughness is approximately the same, consistent with the experimental observation (FIG. 8). As a control case, the peeling test of a hydrogel was modeled with no Mullins effect (i.e., no dissipation) but otherwise the same mechanical properties as the PAAm-alginate hydrogel. From FIG. 2J, it is evident that the calculated interfacial toughness for the control case is approximately the same as the prescribed the intrinsic work of adhesion. The results validate that a relatively high value of the intrinsic work of adhesion and significant mechanical dissipation of the hydrogel are the key in designing tough bonding of hydrogels to solids.

Figure 3A:
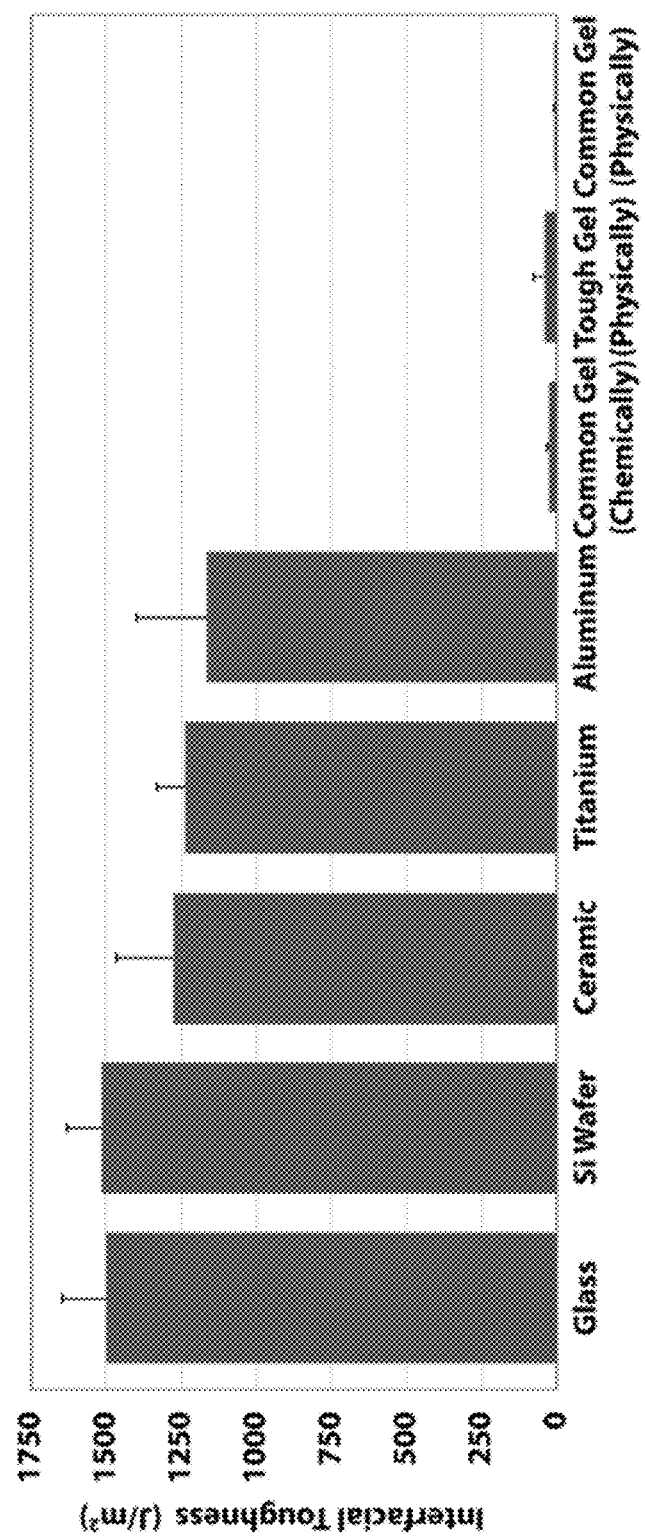
FIGS. 3A-3B show performance of the tough bonding of hydrogels to various solids.
Figure 3B:
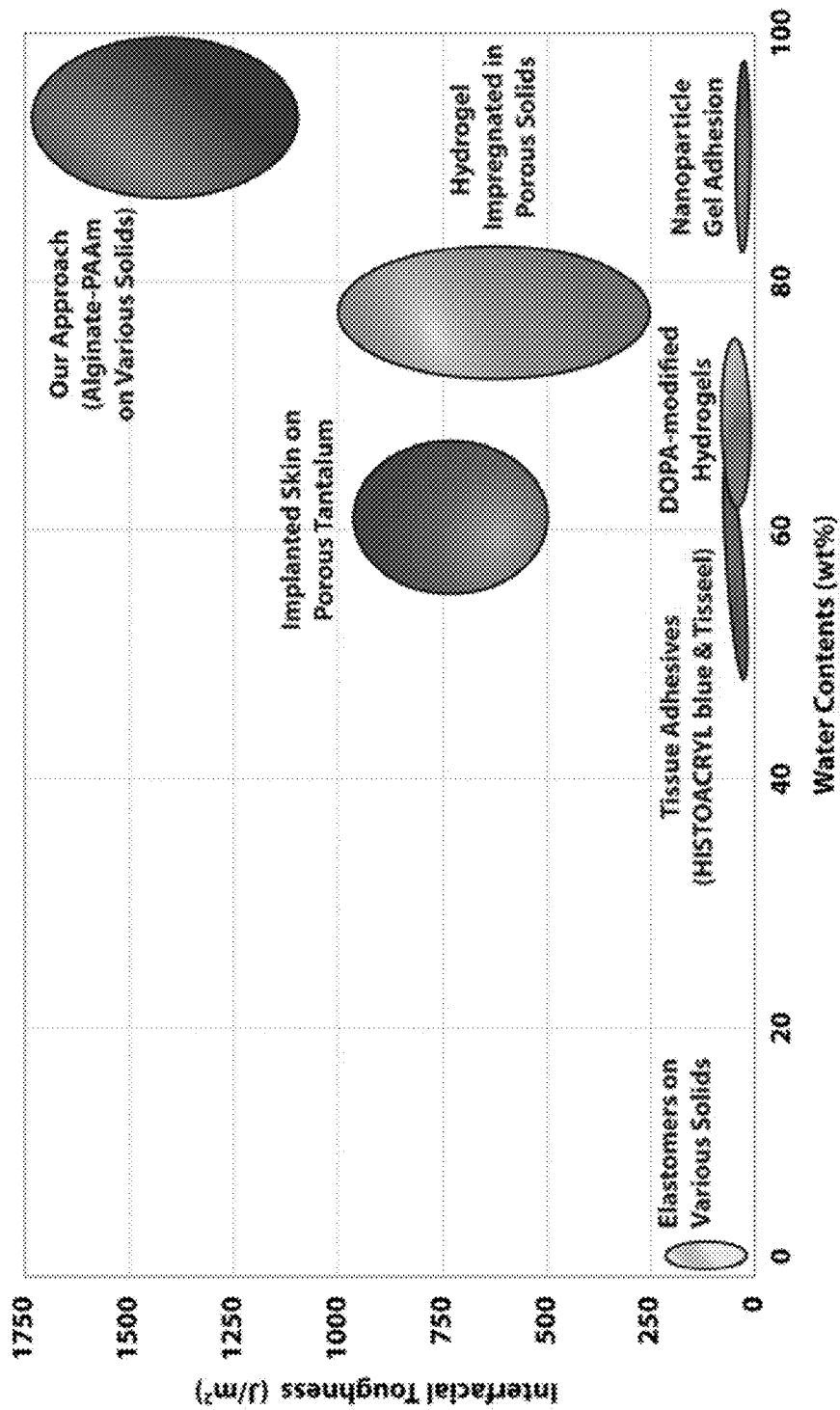
Figure 9:
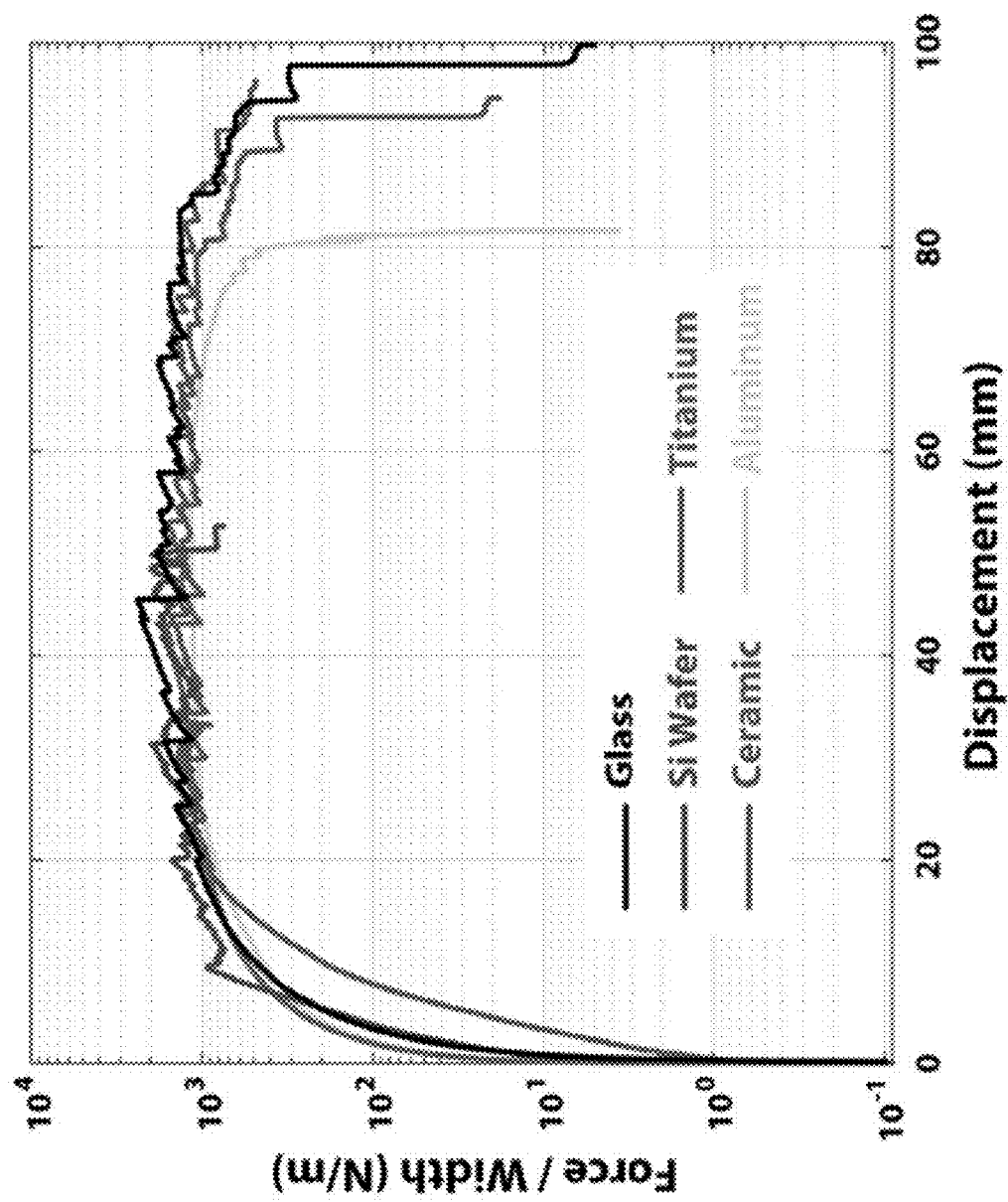
FIG. 9 shows typical curves of peeling force per hydrogel width vs. displacement for PAAm-alginate hydrogels chemically anchored on various solids.
Figure 10A:
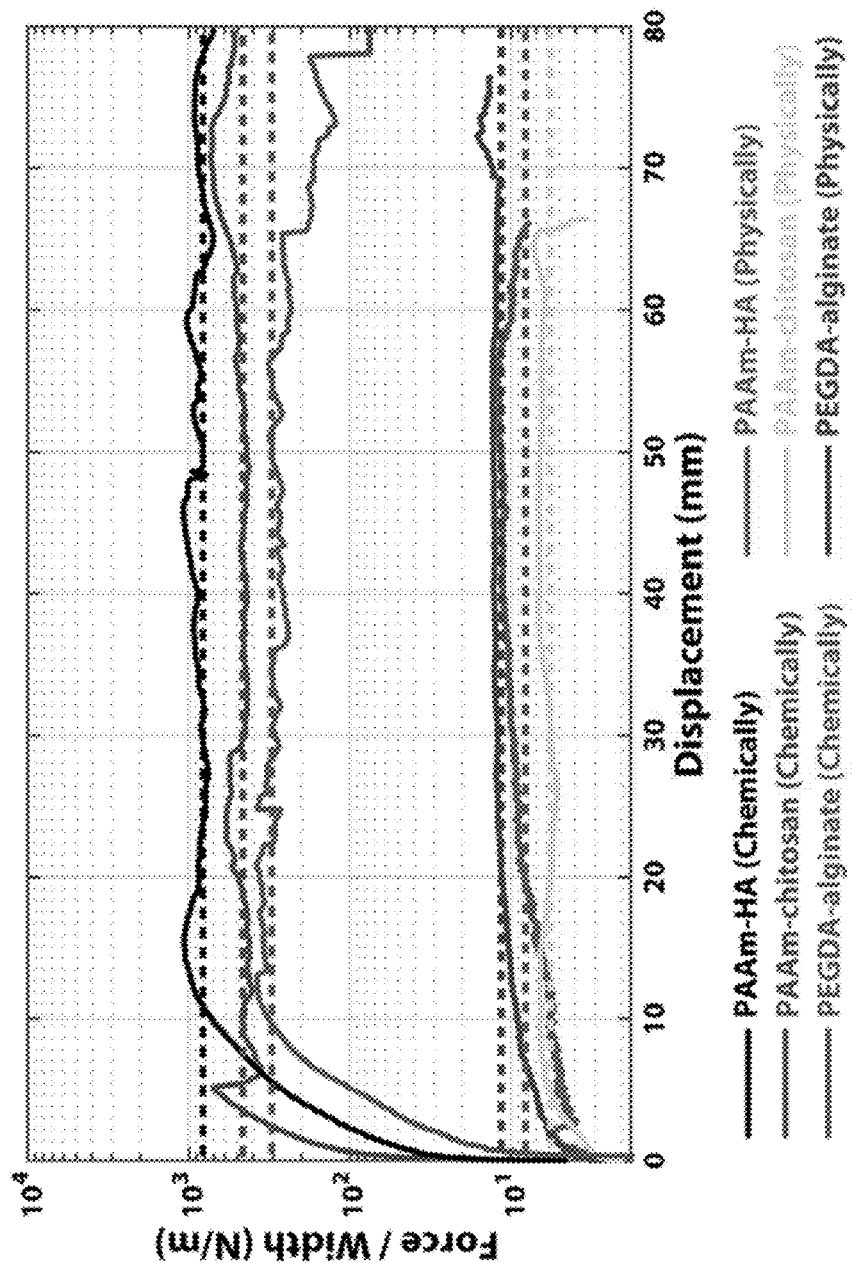
FIGS. 10A-10B show interfacial toughness for various tough hydrogels chemically anchored or physically attached on glass substrates.
Figure 10B:
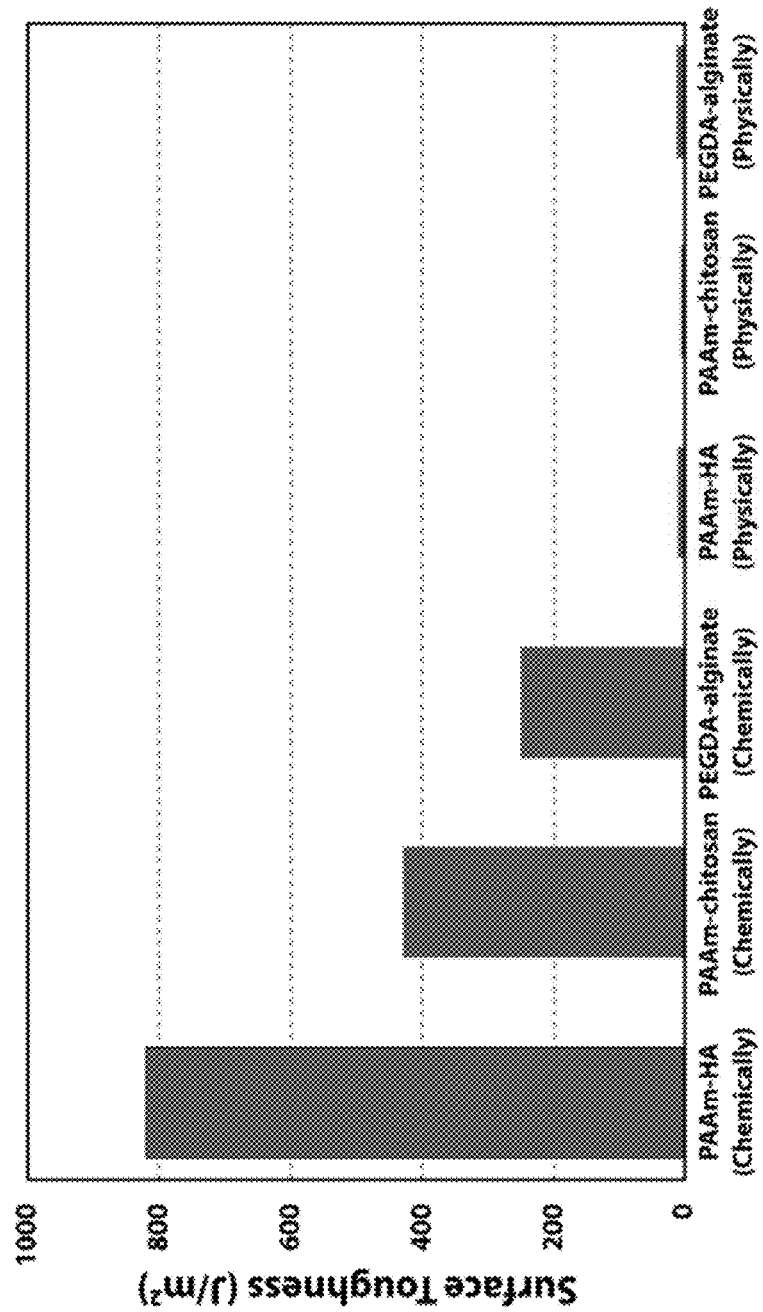
Figure 11:
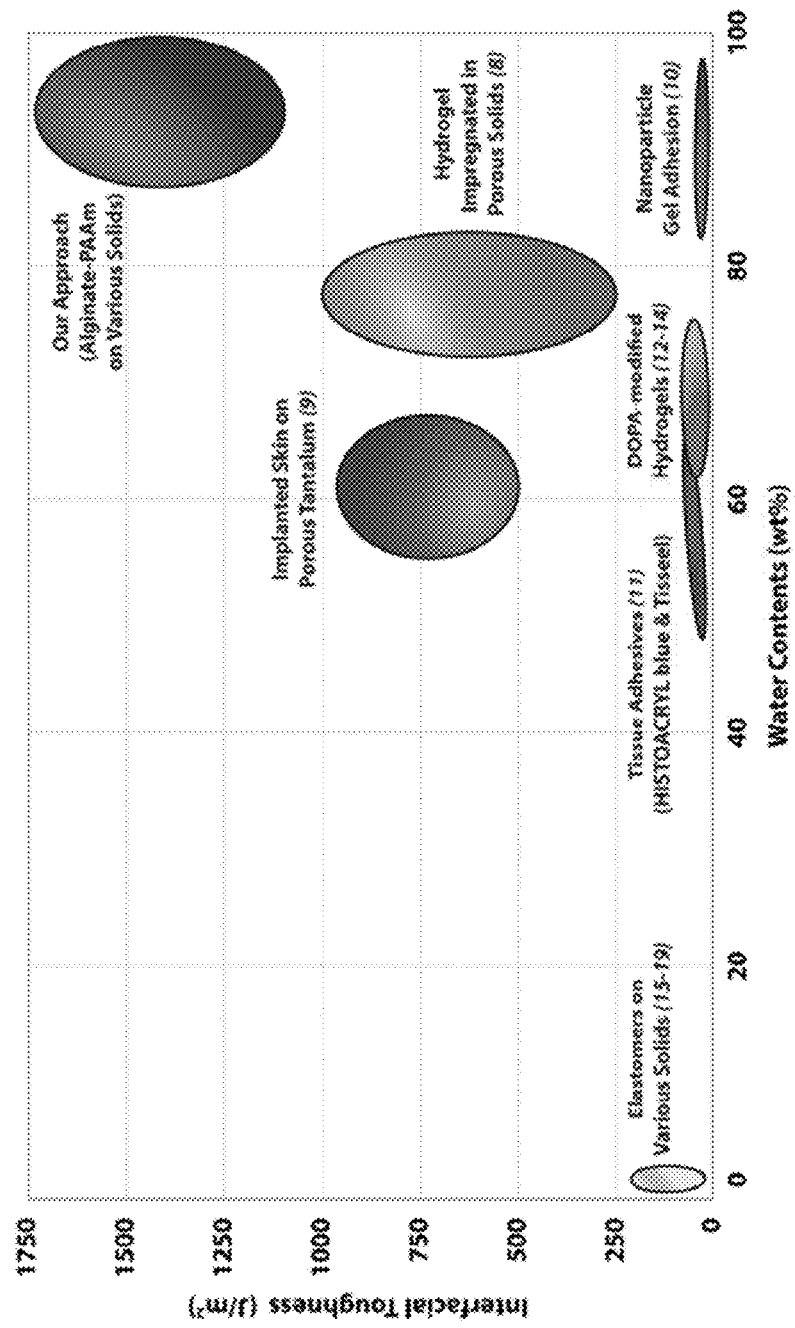
FIG. 11 shows comparison of interfacial fracture toughness of various hydrogel-solid bonding commonly used in engineering applications as functions of water concentrations in the hydrogels, and the references for the values.

The design strategy and fabrication method disclosed herein for tough hydrogel-solid bonding is generally applicable to multiple types of hydrogels and solid materials. FIG. 3A shows that the measured interfacial toughness is consistently high for the PAAm-alginate hydrogel chemically anchored on glass (1500 $Jm^{-2}$), silicon (1500 $Jm^{-2}$), aluminum (1200 $Jm^{-2}$), titanium (1250 $Jm^{-2}$) and ceramics (1300 $Jm^{-2}$). (See Examples and FIG. 9 for measurements of bonding on various solids). FIG. 9 shows the measured interfacial toughness is consistently high for the PAAm-alginate hydrogel chemically anchored on glass (1500 $Jm^{-2}$), silicon (1500 $Jm^{-2}$), aluminum (1200 $Jm^{-2}$), titanium (1250 $Jm^{-2}$) and ceramics (1300 $Jm^{-2}$). Replacing the PAAm-alginate with other types of tough hydrogels including PAAm-chitosan, PAAm-hyaluronan and PEGDA-alginate still yields relatively high interfacial toughness, 300-800 $Jm^{-2}$, compared with the interfacial toughness in controlled cases, 8-20 $Jm^{-2}$ (FIG. 10). FIG. 10A shows typical curves of peeling force per hydrogel width vs. displacement for various tough hydrogels chemically anchored or physically attached on glass substrates. FIG. 10B shows the measured interfacial toughness for various tough hydrogels chemically anchored or physically attached on glass substrates. In FIG. 3B, the interfacial toughness of various hydrogel-solid bonding commonly used in engineering applications was compared as functions of water concentrations in the hydrogels. FIG. 11 shows detailed references (8-19) as follows: 8. Kurokawa, T., Furukawa, H., Wang, W., Tanaka, Y. & Gong, J. P. Formation of a strong hydrogel-porous solid interface via the double-network principle. *Acta biomaterialia* 6, 1353-1359 (2010), 9. Hacking, S., Bobyn, J., Toh, K., Tanzer, M. & Krygier, J. Fibrous tissue ingrowth and attachment to porous tantalum. *Journal of biomedical materials research* 52, 631-638 (2000), 10. Rose, S. el al. Nanoparticle solutions as adhesives for gels and biological tissues. *Nature* 505, 382-385, doi:10.1038/nature12806 (2014), 11. Bundy, K., Schlegel, U., Rahn, B., Geret, V. & Perren, S. An improved peel test method for measurement of adhesion to biomaterials. *Journal of Materials Science: Materials in Medicine* 11, 517-521 (2000), 12. Lin, Q. el al. Adhesion mechanisms of the mussel foot proteins mfp-1 and mfp-3. *Proceedings of the National Academy of Sciences* 104, 3782-3786 (2007), 13. Murphy, J. L., Vollenweider, L., Xu, F. & Lee, B. P. Adhesive performance of biomimetic adhesive-coated biologic scaffolds. *Biomacromolecules* 11, 2976-2984 (2010), 14. Guvendiren, M., Messersmith, P. B. & Shull, K. R. Self-assembly and adhesion of DOPA-modified methacrylic triblock hydrogels. *Biomacromolecules* 9, 122-128 (2007), 15. Sofia, A., Seker, E., Landers, J. P. & Begley, M. R. PDMS-glass interface adhesion energy determined via comprehensive solutions for thin film bulge/blister tests. *Journal of Applied Mechanics* 77, 031007 (2010), 16. Shull, K. R., Ahn, D., Chen, W. L., Flanigan, C. M. & Crosby, A. J. Axisymmetric adhesion tests of soft materials. *Macromolecular Chemistry and Physics* 199, 489-51 I (1998), 17. Jang, E.-J. et al. Effect of surface treatments on interfacial adhesion energy between UV-curable resist and glass wafer. *International Journal of Adhesion and Adhesives* 29, 662-669 (2009), 18. Toonder, J. D., Malzbender, J. & Balkenende, R. Fracture toughness and adhesion energy of sol-gel coatings on glass. *Journal of materials research* 17, 224-233 (2002), and 19. Li, L., Tirrell, M., Korba, G. A. & Pocius, A. V. Surface energy and adhesion studies on acrylic pressure sensitive adhesives. *The Journal of Adhesion* 76, 307-334 (2001), each of which is incorporated by reference in its entirety. Whereas the instant approach allows the hydrogels to contain 90 wt. % of water and does not require porous or topographically patterned surfaces of the solids, it can achieve extremely high interfacial toughness up to 1500 $Jm^{-2}$. In comparison, most of synthetic hydrogel bonding has relatively low interfacial toughness, below 100 $Jm^{-2}$. Although previous work on hydrogels and animal skin tissues impregnated in porous substrates gave interfacial toughness up to 1000 $Jm^{-2}$, the hydrogels and tissues only contains 60 to 80 wt. % water and the requirement of porous solids significantly limits their applications. See Kurokawa, T., Furukawa, H., Wang, W., Tanaka, Y. & Gong, J. P. Formation of a strong hydrogel-porous solid interface via the double-network principle. *Acta biomaterialia* 6, 1353-1359 (2010), which is incorporated by reference in its entirety. Further notably, the instant fabrication method of tough hydrogel bonding is relatively simple compared with previous methods and generally applicable to a wide range of hydrogels and solid materials.

Figure 4A:
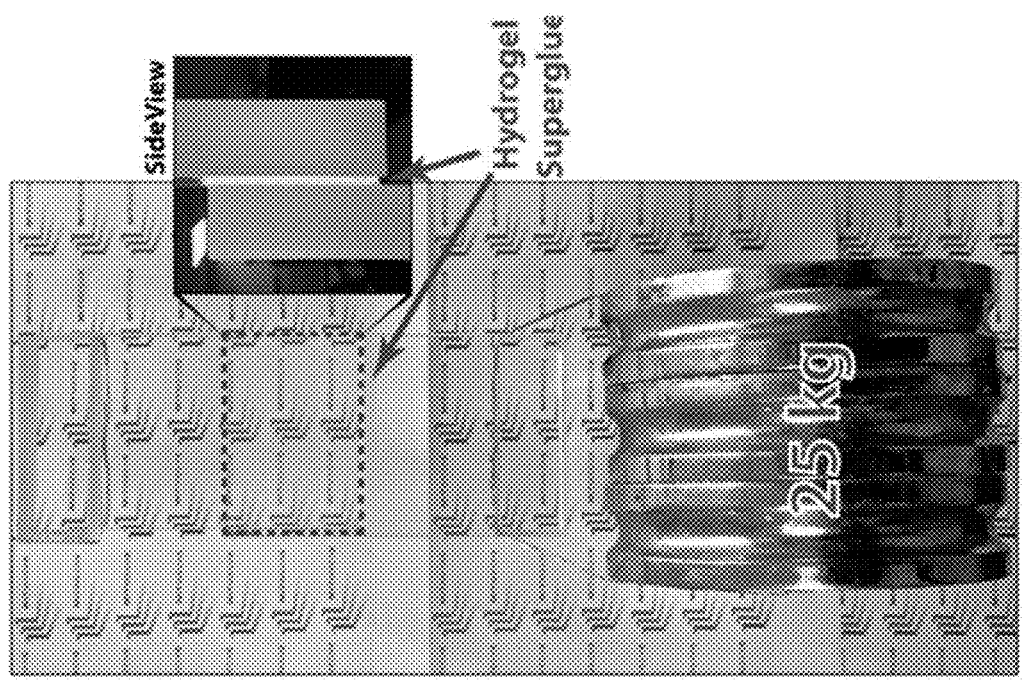
FIGS. 4A-4D show novel applications of hydrogel-solid hybrids enabled by the tough bonding.
Figure 4B:
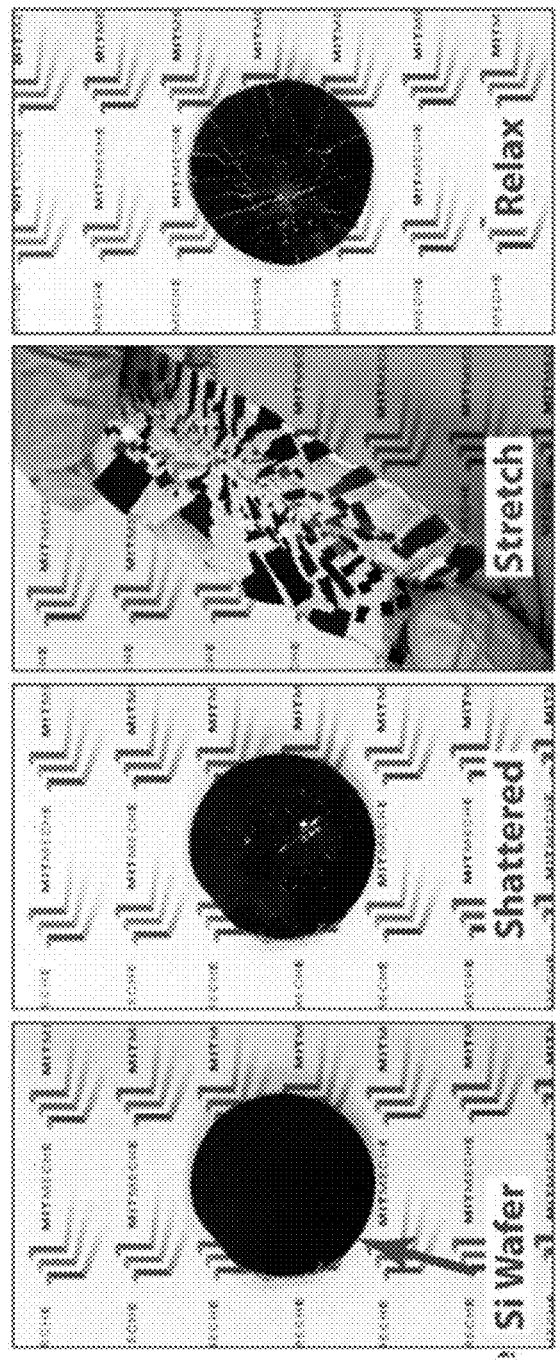
Figure 4C:
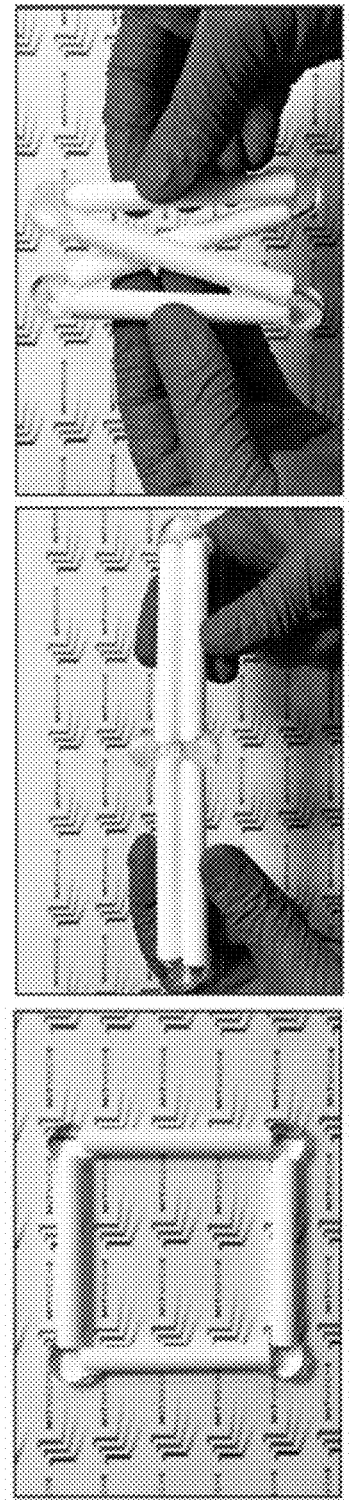
Figure 4D:
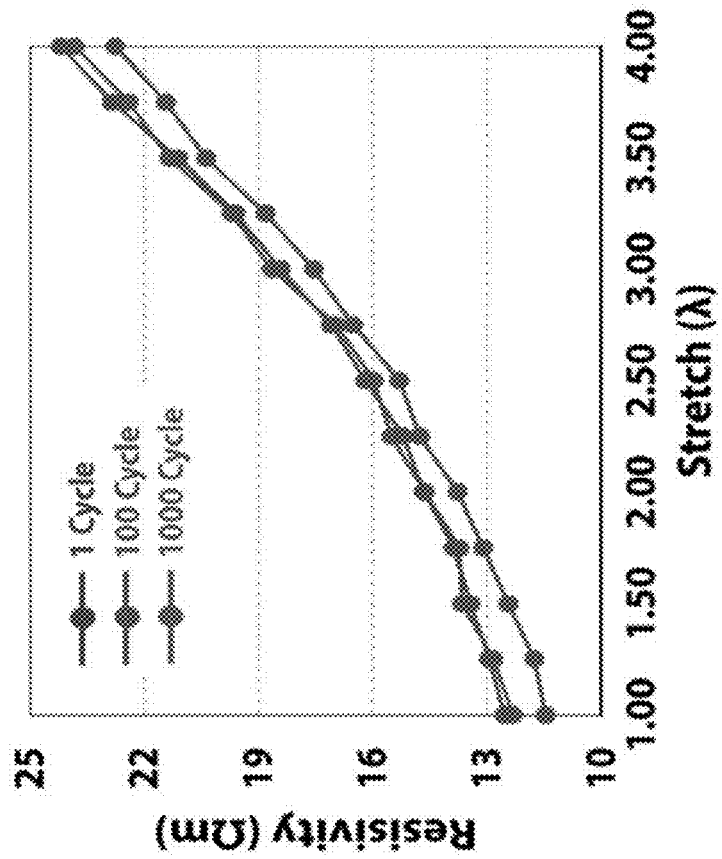
Figure 4D:
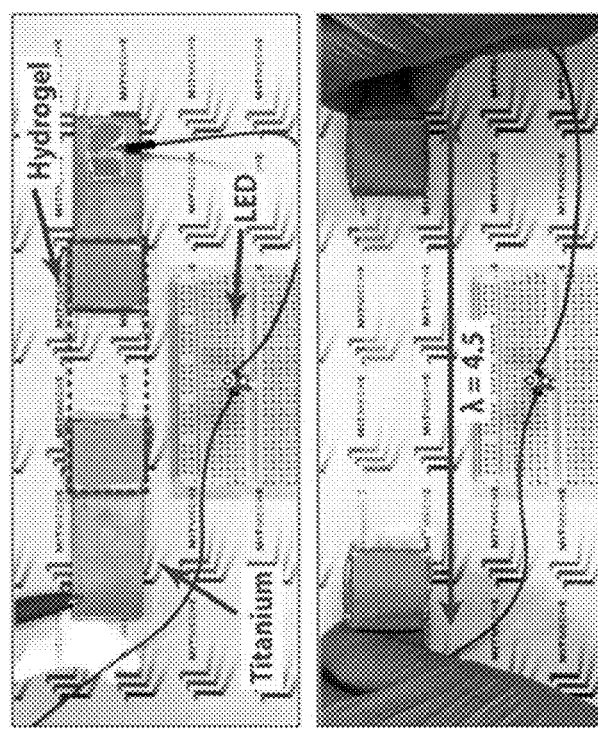

Owning to its simplicity and versatility, the design strategy and fabrication method for tough hydrogel-solid bonding can potentially enable a set of unprecedented functions of hydrogel-solid hybrids. For example, the tough PAAm-alginate hydrogels can now be used as soft (e.g. 30 kPa), wet (e.g., with 90% water) and biocompatible[28] superglues for various solid materials used in biomedical applications. FIG. 4A demonstrates that two glass plates bonded by the hydrogel superglue (dimension, 5 cm×5 cm×1.5 mm) are transparent, and can readily sustain a weight of 25 kg. See Examples for details on fabrication of hydrogel superglue. As another example, the tough hydrogel-solid bonding can re-define the functions and capabilities of commonly-used hydrogel coatings, which are usually mechanically fragile and susceptible to debonding failure. FIG. 4B demonstrates the process of shattering and consequently deforming a silicon wafer coated with a layer of chemically-anchored tough hydrogel. The tough bonding of hydrogel to a silicon wafer gives a new coating that is mechanically protective. Thanks to the high toughness of the hydrogel and interface, the new coating prevents detachment of the shattered pieces of silicon wafer and maintains integrity of the hydrogel-solid hybrid even under high stretch of 3 times, demonstrating hydrogel coating's new capability of mechanical protection and support. (See Examples for details on fabrication of mechanically protective hydrogel coating.) The tough hydrogel bonding can also be used as compliant joints in mechanical and robotic structures. FIG. 4C demonstrates an example of four ceramic bars bonded with the chemically-anchored tough hydrogels. The compliance of the hydrogel combined with high toughness of the bonding enables versatile modes of deformation of the structure. (See Examples for details on fabrication of hydrogel joints.) In addition, the tough hydrogel bonding is electrically conductive and thus can provide a robust interface between hydrogel ionic conductors and metal electrodes. See Keplinger, C. et al. Stretchable, transparent, ionic conductors. *Science* 341, 984-987 (2013), which is incorporated by reference in its entirety. Existing hydrogel-metal interfaces usually rely on conductive copper tapes whose long-term robustness is uncertain. FIG. 4D demonstrates that the hybrid combination of a tough hydrogel chemically anchored on two titanium electrodes is conductive enough to power a LED light, even when the hydrogel is under high stretch of 4.5 times. In addition, the conductivity of the hydrogel-metal hybrid maintains almost the same even after 1000 cycles of high stretch up to 4 times. (See Examples for details on fabrication of robust hydrogel-metal conductors and measurement on its electrical conductivity.)

In summary, chemically anchoring long-chain polymer networks of tough hydrogels on solid surfaces represents a general strategy to design tough and functional bonding between hydrogels and solid materials. A simple method of silane modification of solid surfaces enables tough, transparent and conductive bonding of hydrogels to glass, ceramic, silicon wafer, aluminum and titanium, achieving interfacial toughness over 1000 $Jm^{-2}$-superior to the toughness of tendon-bone and cartilage-bone interfaces. The ability to fabricate extremely robust hydrogel-solid hybrids makes a number of future research directions and applications possible. For example, new microfluidic systems based on tough hydrogels bonded on glass or silicon substrates may be able to account for the effects of convection, diffusion, reaction and deformation simultaneously to better approximate physiological environments than existing microfluidics based on silicone elastomers. As another example, neural probes coated with tough and bio-compatible hydrogels with reduced rigidity can be used to better match the mechanical and physiological properties of brains and spinal cords. See Lin, S., Zhou, Y. & Zhao, X. Designing extremely resilient and tough hydrogels via delayed dissipation. *Extreme Mechanics Leters* 1, 70 (2014), which is incorporated by reference in its entirety.

EXAMPLES

Materials.

Unless otherwise specified, the chemicals in the current work were purchased from Sigma-Aldrich and used without further purification. For the long-chain polymer networks in the hydrogels, acrylamide (AAm; Sigma-Aldrich A8887) was the monomer used for the polyacrylamide (PAAm) network, and 20 kDa polyethylene glycol diacrylate (PEGDA) was used as the macromonomer for PEGDA network. The PEGDA polymers were synthesized based on previously reported protocol[1] using polyethylene glycol (PEG; Sigma-Aldrich 81300), acryloyl chloride (Sigma-Aldrich S49797), triethylamine (TEA; Sigma-Aldrich 471283), dichloromethane (Sigma-Aldrich 270997), sodium bicarbonate (Sigma-Aldrich S6014), magnesium sulfate (Sigma-Aldrich M7506) and diethyl ether (Sigma-Aldrich 346136). For the polyacrylamide (PAAm) hydrogel, N,N-methylenebisacrylamide (MBAA; Sigma-Aldrich 146072) was used as crosslinker, ammonium persulfate (APS; Sigma-Aldrich A3678) as photo initiator and N,N,N',N'-tetramethylethylenediamine (TEMED; Sigma-Aldrich T9281) as crosslinking accelerator. For the PEGDA hydrogel, 2-hydroxy-4'-(2-hydroxyethoxy)-2-methylpropiophenone (Irgacure 2959; Sigma-Aldrich 410896) was used as photo initiator. For the dissipative polymer networks in tough hydrogels, a number of ionically crosslinkable biopolymers were used including sodium alginate (Sigma-Aldrich A2033) ionically crosslinked with calcium sulfate (Sigma-Alginate C3771), chitosan (Sigma-Aldrich 740500) ionically crosslinked with sodium tripolyphosphate (TPP; Sigma-Aldrich 238503), and sodium hyaluronan (HA; Sigma-Aldrich H5542) ionically crosslinked with iron chloride (Sigma-Aldrich 157740). For chemical modification of various solid materials, functional silane 3-(trimethoxysilyl) propyl methacrylate (TMSPMA; Sigma-Aldrich 440159) and acetic acid (Sigma-Aldrich 27225) were used.

In the 90-degree peeling experiments, borosilicate glass (McMaster Carr), silicon wafers with a thermal oxidized layer (UniversityWafer), nonporous glass mica ceramic (McMaster Carr), anodized aluminum (Inventables) and titanium (McMaster Carr) plates were used as the solid substrates. As a stiff backing for the hydrogel sheet, ultrathin glass film (25 μm; Schott Advanced Optics) was used together with transparent Scotch tape (3M). In the conductive hydrogel-metal bonding experiments, sodium chloride (Sigma-Aldrich 746398) solution was used as an electrolyte.

Synthesis of Various Tough Hydrogels.

The PAAm-alginate tough hydrogel was synthesized by mixing 10 mL of a carefully degassed aqueous precursor solution (12.05 wt % AAm, 1.95 wt. % sodium alginate, 0.017 wt. % MBAA and 0.043 wt. % APS) with calcium sulfate slurry (0.1328 times the weight of sodium alginate) and TEMED (0.0025 times the weight of AAm)[2]. The mixture was mixed quickly and poured into a laser-cut Plexiglass acrylic mold. The lid of the mold included an opening for the functionalized substrates to be in contact with hydrogel precursor solution. The gel was crosslinked by UV light irradiation for an hour (254 nm UV with 6.0 mWcm$^{-2}$ average intensity; Spectrolinker XL-1500).

The PAAm-hyaluronan tough hydrogel was synthesized by mixing 10 mL of degassed precursor solution (18 wt. % AAm, 2 wt % HA, 0.026 wt. % MBAA and 0.06 wt. % APS) with 60 μL of iron chloride solution (0.05 M) and TEMED (0.0025 times the weight of AAm). The PAAm-chitosan tough hydrogel was synthesized by mixing 10 mL of degassed precursor solution (24 wt. % AAm, 2 wt. % chitosan, 0.034 wt. % MBAA and 0.084 wt. % APS) with 60 L of TPP solution (0.05 M) and TEMED (0.0025 times the weight of AAm). The PEGDA-alginate tough hydrogel was synthesized by mixing 10 mL of a degassed precursor solution (20 wt. % PEGDA and 2.5 wt. % sodium alginate) with calcium sulfate slurry (0.068 times the weight of sodium alginate) and Irgacure 2959 (0.0018 the weight of PEGDA). The curing procedure was identical to the PAAm-alginate tough hydrogel.

Common PAAm hydrogel was synthesized by mixing 10 mL of degassed precursor solution (23 wt. % AAm, 0.051 wt. % MBAA and 0.043 wt. % APS) and TEMED (0.0025 times the weight of AAm). The curing procedure was identical to the PAAm-alginate tough hydrogel. Note that the modulus of the common PAAm hydrogel was tuned to match the PAAm-alginate tough hydrogel's modulus (30 kPa) based on the previously reported data. See Sun, J.-Y. el al. Highly stretchable and tough hydrogels. *Nature* 489, 133-136 (2012), which is incorporated by reference in its entirety.

Chemical Modification of Various Solid Surfaces.

The surfaces of various solids were functionalized by grafting functional silane TMSPMA. Solid substrates were thoroughly cleaned with acetone, ethanol and deionized water in that order, and completely dried before the next step. Cleaned substrates were treated by oxygen plasma (30 W with 200 mTorr pressure; Harrick Plasma PDC-001) for 5 min. Right after the plasma treatment, the substrate surface was covered with 5 mL of the silane solution (100 mL deionized water, 10 μL of acetic acid with pH 3.5 and 2 wt. % of TMSPMA) and incubated for 2 hours at room temperature. Substrates were washed with ethanol and completely dried. Functionalized substrates were stored in low humidity conditions before being used for experiments.

During oxygen plasma treatment of the solids, oxide layers on the surfaces of the solids (silicon oxide on glass and silicon wafer, aluminum oxide on aluminum, titanium oxide on titanium, and metal oxides on ceramics) react to hydrophilic hydroxyl groups by oxygen radicals produced by oxygen plasma. These hydroxyl groups on the oxide layer readily form hydrogen bonds with silanes in the functionalization solution generating a self-assembled layer of silanes on the oxide layers. See Dugas, V. & Chevalier, Y. Surface hydroxylation and silane grafting on fumed and thermal silica. *Journal of colloid and interface science* 264, 354-361 (2003), which is incorporated by reference in its entirety. Notably, the methoxy groups in TMSPMA are readily hydroxylated in acidic aqueous environment and formed silanes. These hydrogen bonds between surface oxides and silanes become chemically stable siloxane bonds with removal of water, forming strongly grafted TMSPMA onto oxide layers on various solids. See Yoshida, W., Castro, R. P., Jou, J.-D. & Cohen, Y. Multilayer alkoxysilane silylation of oxide surfaces. *Langmuir: the ACS journal of surfaces and colloids* 17, 5882-5888 (2001), which is incorporated by reference in its entirety.

Grafted TMSPMA has a methacrylate terminal group which can copolymerize with the acrylate groups in either AAm or PEGDA under free radical polymerization process, generating chemically anchored long-chain polymer network onto various solid surfaces. See Muir, B. V., Myung, D., Knoll, W. & Frank, C. W. Grafting of cross-linked hydrogel networks to titanium surfaces. *ACS Appl Mater Interfaces* 6, 958-966, doi:10.1021/am404361v (2014), which is incorporated by reference in its entirety. Since the long-chain polymer networks in hydrogels are chemically anchored onto solid surfaces via strong and stable covalent bonds, the interfaces can achieve higher intrinsic work of adhesion than physically attached hydrogels. The silane functionalization chemistry is summarized in FIG. 5. The solid substrates including glass, ceramic, aluminum and titanium were exposed to oxygen plasma to introduce hydroxyl-activated surface oxides on their surfaces. Functional silane TMSPMA was then grafted onto the hydroxyl-activated surface through siloxane covalent chemistry. The long-chain polymer network of PAAm or PEGDA was then covalently crosslinked to the grafted silane.

Interfacial Toughness Measurement.

The interfacial toughness of various hydrogel-solid bonding was measured using the standard 90-degree peeling test (ASTM D 2861) with mechanical testing machine (2 kN load cell; Zwick/Roell Z2.5) and 90-degree peeling fixture (TestResources, G50). All rigid substrates were prepared with 7.62 cm in width, 12.7 cm in length and 0.32 cm in thickness. Hydrogels were cured on the solid substrates within Plexiglass acrylic mold with size of 110 mm×30 mm×6 mm. As a stiff backing for the hydrogel, TMSPMA grafted ultrathin glass film was used with an additional protective layer of transparent Scotch tape (3M) on top of the glass film. Prepared samples were tested with the standard 90-degree peeling test setup (FIG. 6). All 90-degree peeling tests were performed with constant peeling speed of 50 mm/min. The measured force reached a plateau as the peeling process entered steady state, and this plateau force was calculated by averaging the measured force values in the steady state region with common data processing software. The interfacial toughness Γ was determined by dividing the plateau force F by the width of the hydrogel sheet W. To test the dependence of interfacial toughness on hydrogel thickness, a set of 90-degree peeling tests were carried out on PAAm-alginate hydrogels with different thicknesses (1.5 mm-6 mm) chemically anchored on glass substrates (FIG. 8A).

To demonstrate that the proposed strategy and method is generally applicable to multiple types of hydrogels, standard 90-degree peeling tests was performed on various types of tough hydrogels including PAAm-chitosan, PAAm-hyaluronan and PEGDA-alginate hydrogels chemically anchored on glass substrates (FIG. 10A). The measured interfacial toughness for these tough hydrogels (300-800 $Jm^{-2}$, FIG. 10B) was consistently much higher than the interfacial toughness of the control cases (8-15 $Jm^{-2}$, FIG. 10B).

Preparation of Hydrogel Superglue, Coating and Joints.

For the hydrogel superglue, two TMSPMA grafted glass plates (5 cm×12 cm×2 cm) were connected by thin tough hydrogel (5 cm×5 cm×1.5 mm) and subjected to weight up to 25 kg. Weight was applied by hanging metal pieces of known weights with metal wires. Hydrogel joints were fabricated by curing tough hydrogel using Plexiglass acrylic mold between four TMSPMA grafted nonporous glass mica ceramic rods (75 mm length with 10 mm diameter) forming an interconnected square structure. To test the robustness of these hydrogel joints, each joint was twisted and rotated to large angles. Hydrogel coating was fabricated by curing a thin (1 mm) tough hydrogel layer onto the TMSPMA grafted thermal oxide silicon wafer (100 μm thickness with 50.8 mm diameter). To Test the Hydrogel Coating's Protective Capability, the Wafer was Shattered with Metal Hammer and stretched the hydrogel-coated wafer by hand up to 3 times of its original diameter. In preparation of samples, the PAAm-alginate tough hydrogel was used. The grafting of TMSPMA on various solids was conducted as discussed in the previous section.

Electrically Conductive Hydrogel Interface.

Figure 12B:
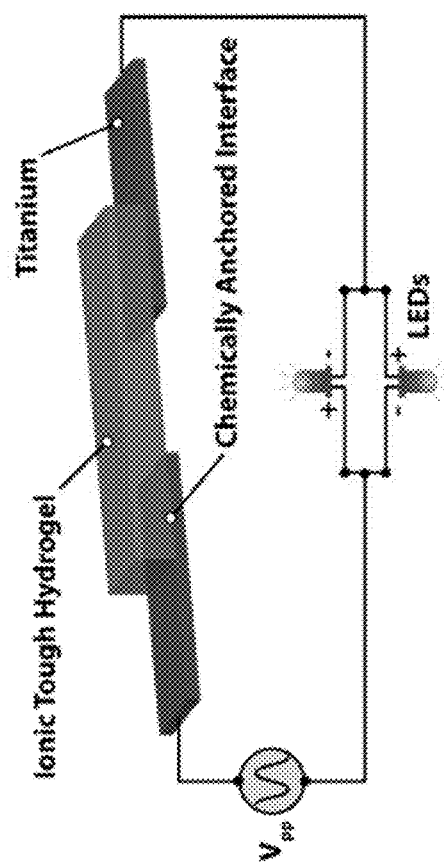
FIGS. 12A-12B show schematic illustrations for experiments on conductive hydrogel-metal interface.
Figure 12A:
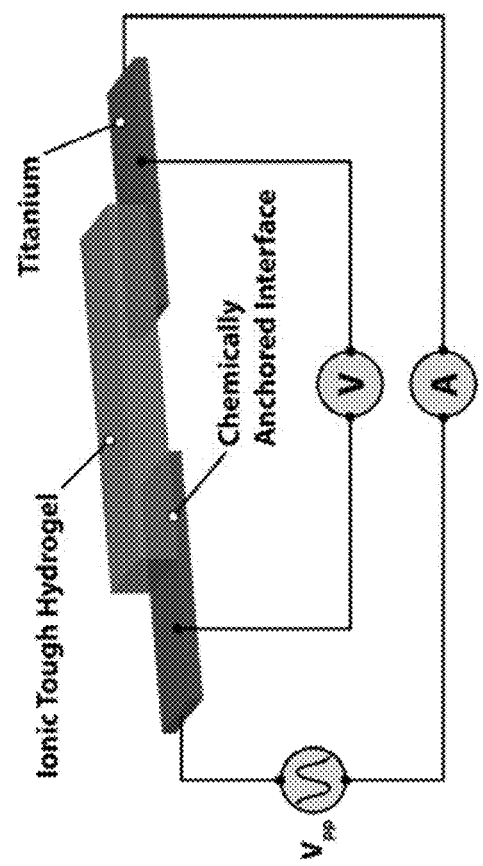

Ionic tough hydrogel was prepared by curing tough PAAm-alginate hydrogel on two TMSPMA grafted titanium slabs and then soaking in sodium chloride solution (3 M) for 6 hours. The electric resistance of the ionic hydrogel-titanium hybrid was measured using the four-point method. See Yang, C. H. el al. Ionic cable. *Extreme Mechanics Letters* (2015), which is incorporated by reference in its entirety. The ionic hydrogel-titanium hybrid was connected in series with a function generator and galvanometer, and the voltage between titanium slabs was measured with a voltmeter connected in parallel (FIG. 12A). The ratio of the measured voltage to the measured current gave the electric resistance of ionic hydrogel-titanium hybrid. The resistivity was then calculated using the relation $R=\rho L/A$ for a given geometry of the ionic hydrogel in test where ρ is resistivity, L length of the gel and A cross-sectional area. The rate of stretch was kept constant at 100 mm/min using a mechanical testing machine. All electric connections other than the ionic tough hydrogel-titanium interface were established using conductive aluminum tapes. Cyclic extension of the ionic tough hydrogel was done by mechanical testing machine based on predetermined numbers of cycles. The ionic tough hydrogel's ability to transmit power was tested by lighting up LEDs using AC power source (1 kHz 5V peak-to-peak sinusoidal). FIG. 12B illustrates the experimental setup for illustration of power transmission by lighting up LEDs with transmitted power from AC power source through ionic tough hydrogel bonded on titanium slabs.

Numerical Model for 90-Degree Peeling of Tough Hydrogel.

Figure 13:
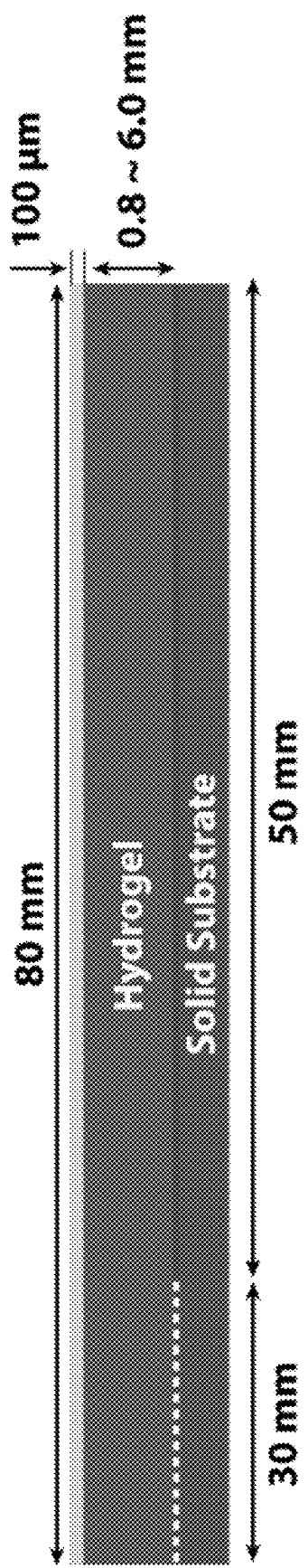
FIG. 13 shows schematic illustration of the finite-element model for numerical simulation of peeling test.
Figure 14B:
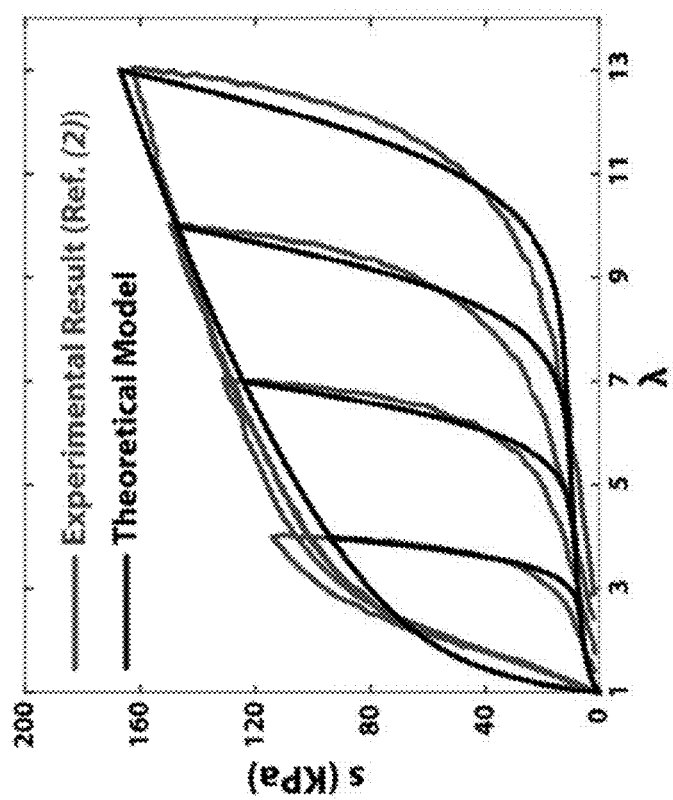
FIGS. 14A-14B show Mullins effect and cohesive-zone model.
Figure 14A:
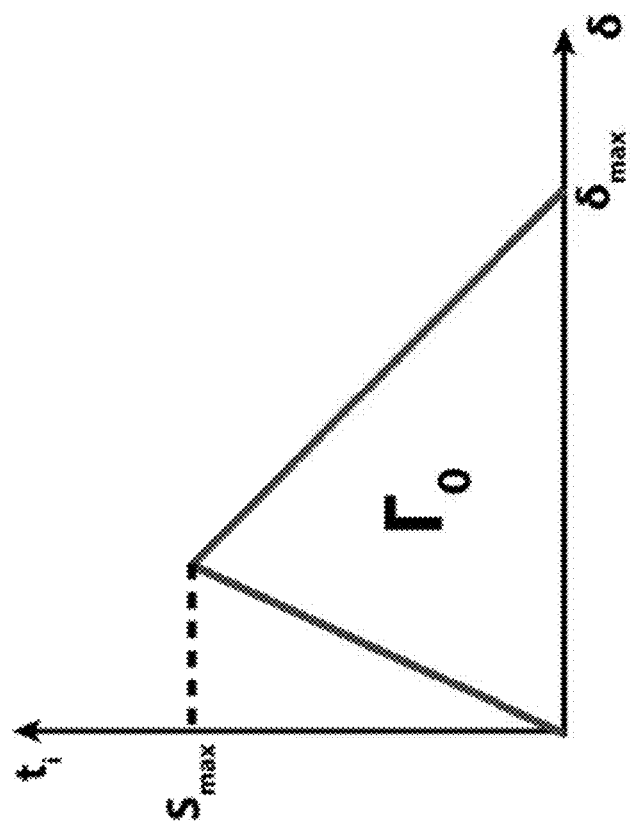

A two-dimensional (2D) finite-element model was developed to simulate the 90-degree-peeling test of hydrogels bonded on solid substrates. As shown in FIG. 13, a hydrogel strip with length 80 mm and thickness 0.8-6 mm was adhered on a solid substrate, where a portion of the gel strip (30 mm) was initially detached. The yellow line indicates the stiff backing and the red line indicates the hydrogel-solid interfacial modeled as a cohesive zone. The white dotted line indicates the unbounded part of hydrogel. The deformation of the hydrogel strip was assumed to be under plane-strain condition. The elastic properties and energy dissipation of the hydrogel were modeled as the Ogden hyperelastic material and Mullins effect, respectively. See Wang, Q. el al. High-water-content mouldable hydrogels by mixing clay and a dendritic molecular binder. *Nature* 463, 339-343 (2010), which is incorporated by reference in its entirety. FIG. 14A shows stress-strain hysteresis of the PAAm-alginate hydrogel measured from experiments and fitted with the Mullins effect model. The parameters of the model were obtained by fitting the model to experimental data from mechanical tests on the PAAm-alginate hydrogel (FIG. 14A). See Sun, J.-Y. et al. Highly stretchable and tough hydrogels. *Nature* 489, 133-136 (2012), which is incorporated by reference in its entirety. For the elastic properties, the one-term Ogden model can be expressed as $$U_{ela}=2\mu/\alpha^2(\lambda_1^\alpha+\lambda_2^\alpha+\lambda_3^\alpha-3)$$

where $U_{ela}$ is the strain energy density, $\lambda_1$ the $i_{th}$ principal stretch, $\mu$ the shear modulus (fitted to be 36.57 kPa), and $\alpha$ the Ogden parameter (fitted to be 1.473). The theoretical model for the Mullins effect can be expressed as $$U = \eta \tilde{U}_{ela} + \phi(\eta)$$

$$\phi(\eta) = \int_1^\eta [(m+\beta U_{ela}^m)\text{erf}^{-1}(r(1-\eta))U_{ela}^m]d\eta$$

$$\eta = 1 - \frac{1}{r}\text{erf}[(U_{ela}^m - \tilde{U}_{ela})/(m+\beta U_{ela}^m)]$$

where $\eta$ is a damage variable ($0<\eta\leq1$), $\tilde{U}_{ela}$ is the strain energy density of perfectly elastic material (i.e., the primary loading path is also the unloading path), $U_{ela}^m$ denotes the maximum strain energy density before unloading, the function $\phi(\eta)$ is referred to as the damage function, erf is the error function, and the material parameters r=1.1, m=4.076, and $\beta$=0.2818 were obtained by fitting the model to measured stress-strain hysteresis of the PAAm-alginate hydrogel. See Sun, J.-Y. el al. Highly stretchable and tough hydrogels. *Nature* 489, 133-136 (2012), which is incorporated by reference in its entirety.

The stiff backing was modeled as a linear elastic material with very high Young's modulus (i.e., 2 GPa) and very low thickness (i.e., 100 μm). FIG. 14B shows triangular cohesive law for the cohesive layer. $t_i$ (i=n,s) represents the nominal stress, and the subscripts n and s indicate deformation normal to and tangential to the interface, respectively.

The cohesive layer on the interface was characterized by a triangular cohesive law with maximum strength $S_{max}$ and maximum separation distance $\delta_{max}$ (FIG. 14B). The damage of the cohesive layer follows the quadratic nominal stress criterion, $$\left\{\frac{t_n}{S_{max}}\right\}^2 + \left\{\frac{t_s}{S_{max}}\right\}^2 = 1$$

where $t_i(n,s)$ represents the nominal stress, and the subscript n and s indicate deformation normal to and tangential to the interface, respectively.

Figure 15:
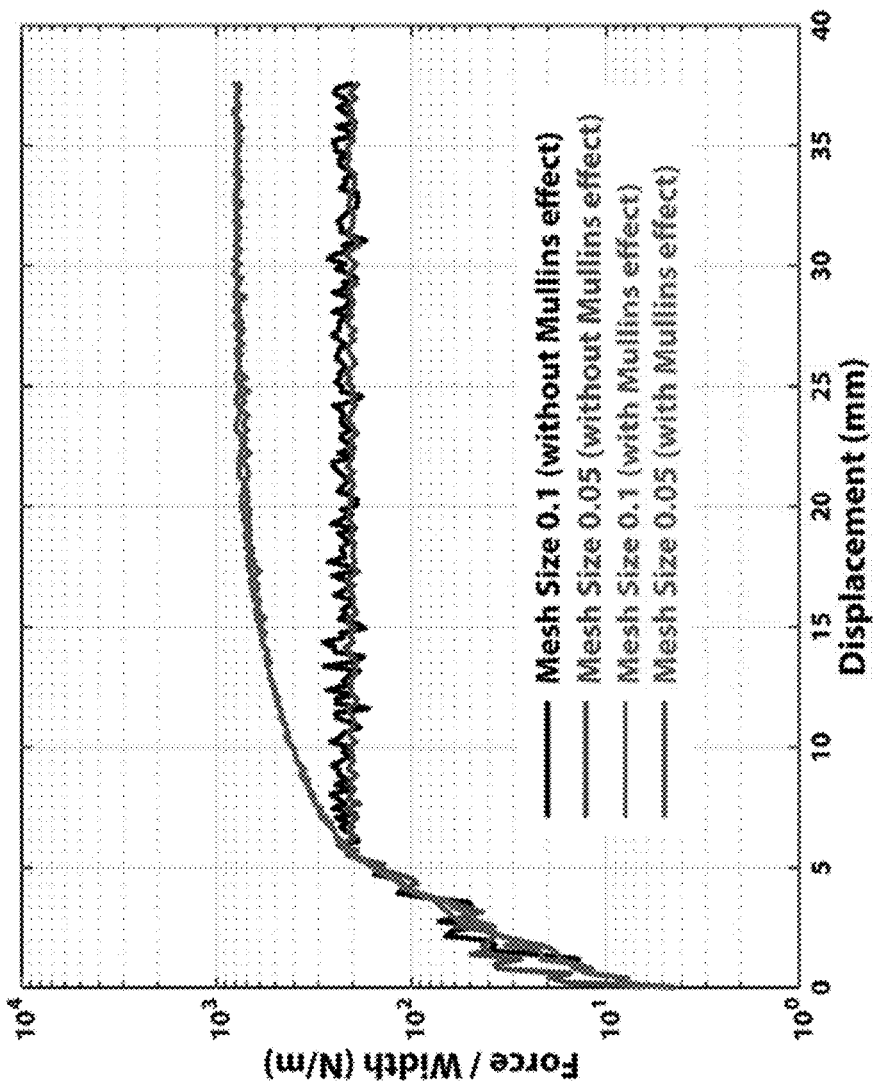
FIG. 15 shows mesh insensitivity of numerical simulation.

All the numerical simulations were carried out with ABAQUS/Explicit. The hydrogel and stiff backing were modeled with CPE4R element, and the cohesive layer at the interface was modeled with COH2D element. The Poisson's ratio of the hydrogel was set to be 0.499 to approximate incompressibility. The adhesive interface was uniformly discretized with very fine mesh size (0.1 mm). Simulations were performed with an even finer mesh size (0.05 mm), which gave similar peeling forces and thus verified the mesh insensitivity of the model disclosed here (FIG. 15). Mass scaling technique was adopted to maintain a quasi-static process during the peeling simulations. To simulate the peeling test described in the material and experiment section, the left edge of the strip was first rotated 90 degrees and then moved vertically at a constant velocity, with the reaction force on the left edge of the strip recorded. The interfacial toughness was then calculated as the steady-state reaction force divided by the width of the strip, which is set to be unity in the current model.

Figure 16B:
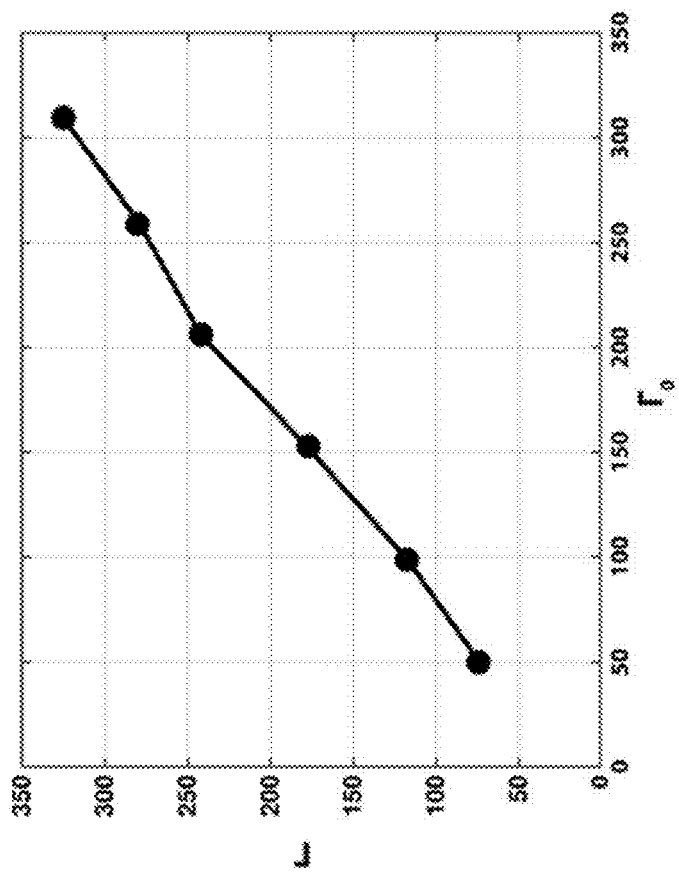
FIGS. 16A-16B show the calculated interfacial toughness $\Gamma$ of a pure elastic hydrogel bonded on rigid substrates with different intrinsic work of adhesion $\Gamma_0$.
Figure 16A:
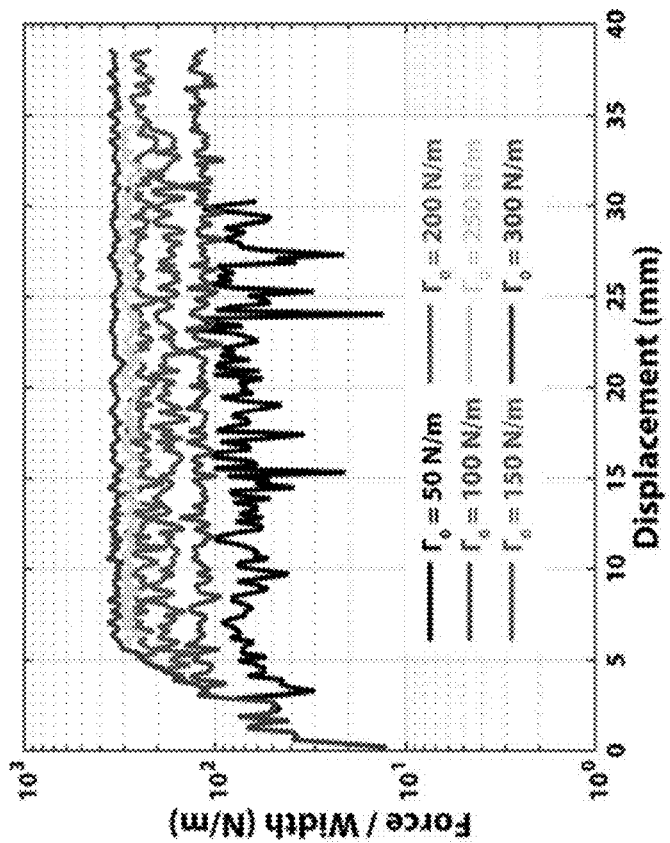
Figure 17B:
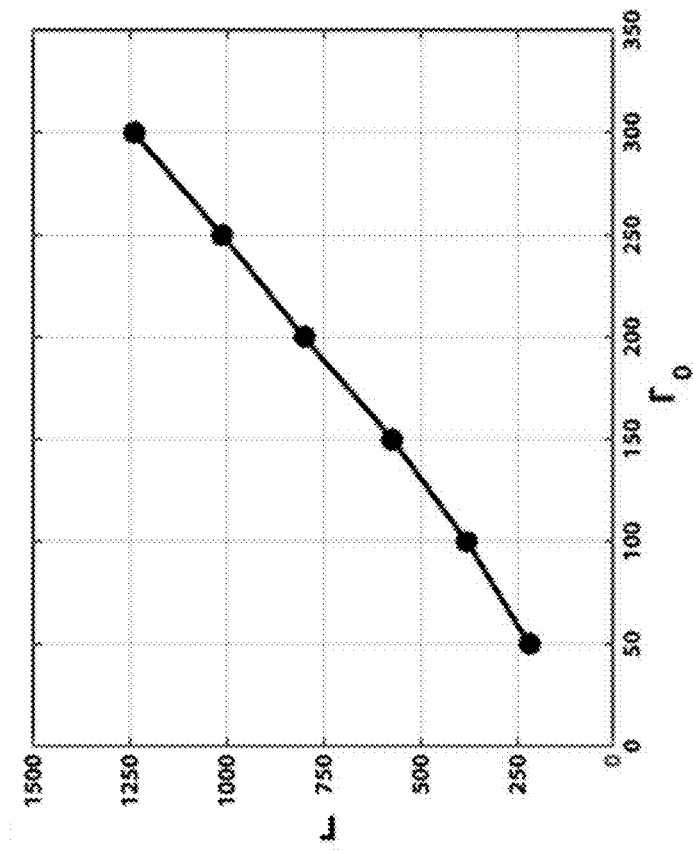
FIGS. 17A-17B show the calculated interfacial toughness $\Gamma$ of the PAAm-alginate hydrogel bonded on rigid substrates with different intrinsic work of adhesion $\Gamma_0$.
Figure 17A:
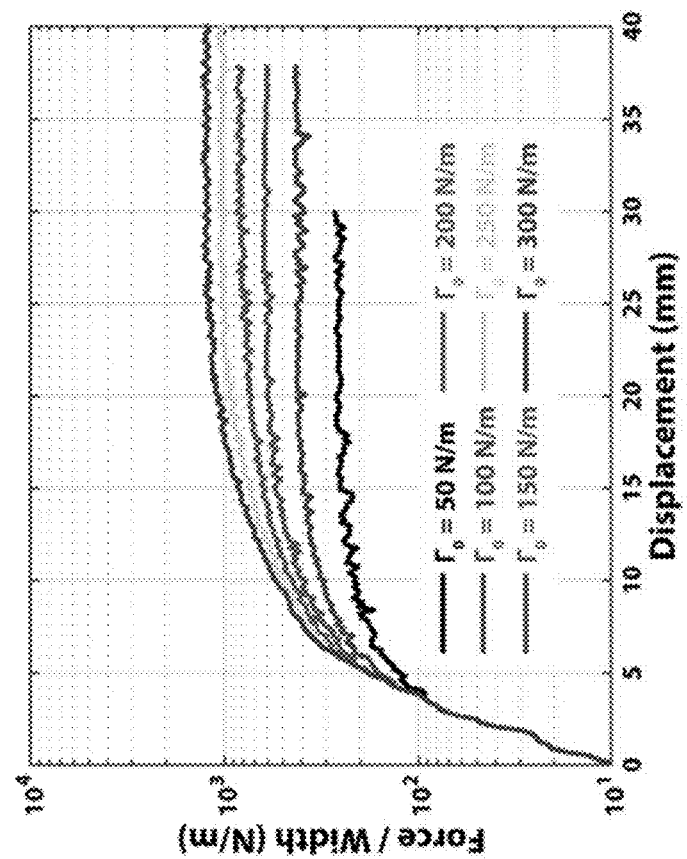
Figure 18C:
Figure 18B:
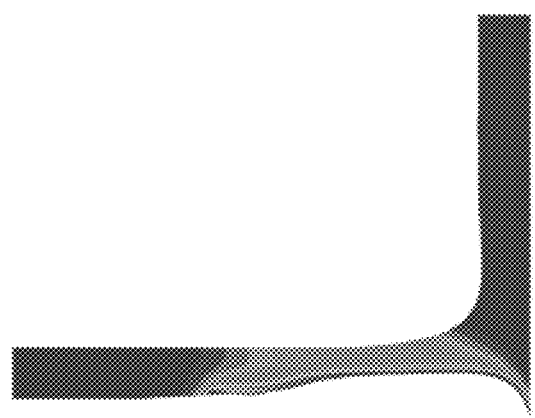
Figure 18A:
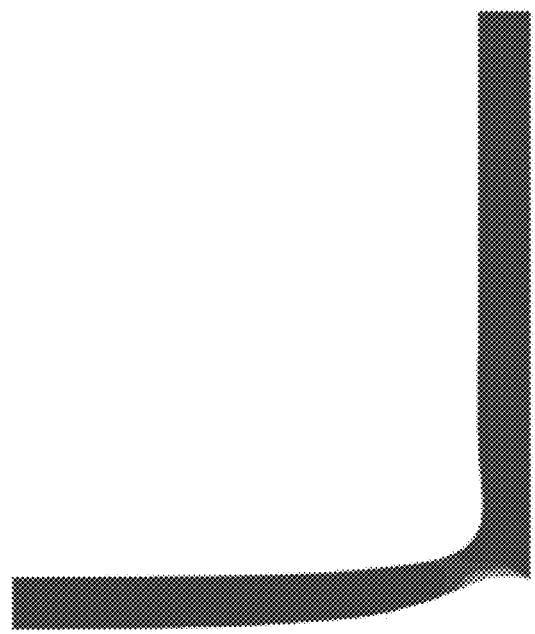
Figure 19:
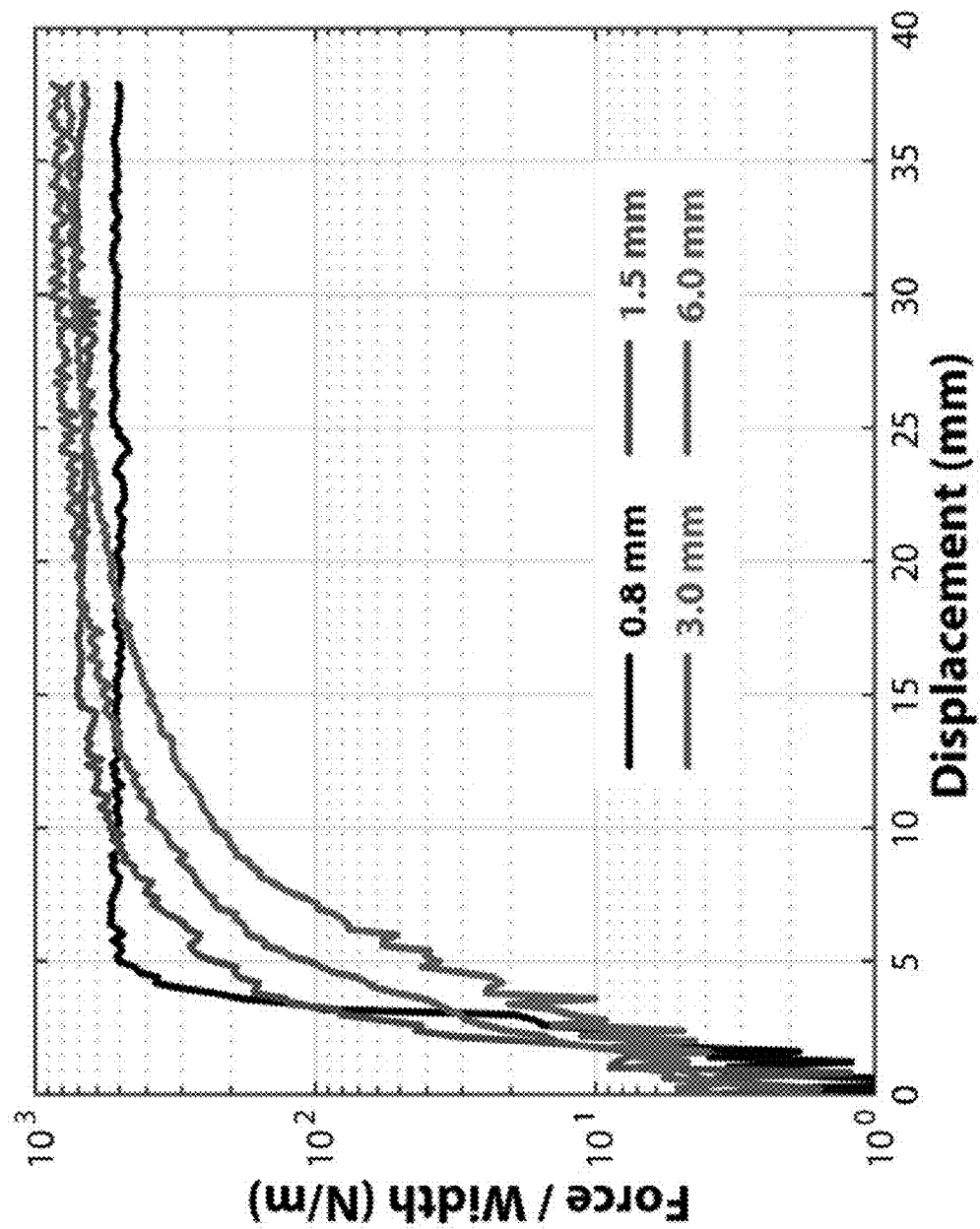
FIG. 19 shows interfacial toughness of PAAm-alginate hydrogels with different thicknesses bonded on rigid substrates calculated from the finite-element models.

To validate the numerical model, the peeling process of a pure elastic material was first simulated without energy dissipation. To prescribe different intrinsic work of adhesion $\Gamma_0$ in the cohesive zone, $S_{max}$ was fixed to be 500 kPa and varied $\delta_{max}$ from 0.2 to 1.2 mm. FIG. 16A gives the calculated curves of peeling force per unit width of hydrogel vs. vertical displacement for different values of $\Gamma_0$. As demonstrated in FIG. 16B, the calculated interfacial toughness for a pure elastic material $\Gamma$ was indeed very close to the intrinsic work of adhesion $\Gamma_0$, indicating that the current numerical model is capable of accurately calculating the interfacial toughness. The finite-element model gives $\Gamma \approx \Gamma_0$ for pure elastic hydrogel. The same peeling tests for PAAm-alginate hydrogels was simulated with energy dissipation and presented the results in FIG. 17. FIG. 17A shows the calculated curves of peeling force per hydrogel width vs. displacement for bonding with different values of $\Gamma_0$. FIG. 17B shows the calculated interfacial toughness as a function of the prescribed $\Gamma_0$. The finite-element model shows that the interfacial toughness is multiple times of the intrinsic work of adhesion for PAAm-alginate hydrogel. It can be found that the energy dissipation can lead to an interfacial toughness four times of the baseline intrinsic work of adhesion. The simulation snapshots of the peeling process in FIG. 18 also confirm that a process zone with significant energy dissipation formed during the interfacial crack propagation. FIGS. 18A-18C show peeling process of the PAAm-alginate hydrogel, including crack initiation, crack propagation and stead state. FIGS. 18D-18F show peeling process of a pure elastic hydrogel, including crack initiation and stead state. The color indicates the energy dissipation per unit area in the materials. For the materials without energy dissipation, the interfacial crack reached the steady state immediately after its initiation (FIGS. 18D-18F) while there was a crack growth stage from the crack initiation to the final steady state for the materials with energy dissipation (FIGS. 18A-18C). The effect of hydrogel thickness on the interfacial toughness was tested with the finite-element model. FIG. 19 shows the calculated curves of peeling force per hydrogel width vs. displacement for samples with thickness of 0.8 mm, 1.5 mm, 3 mm and 6 mm, respectively. The interfacial toughness does not significantly depend on hydrogel thickness in the range of 1.5 mm-6 mm. As shown in FIG. 19, the calculated interfacial toughness was very close to each other for the thickness in the range of 1.5 mm-6 mm, which was consistent with the disclosed experimental measurements.

Other embodiments are within the scope of the following claims.

What is claimed is:

1. An article comprising:
    a substrate, the substrate having at least one surface that is non-porous and non-topographically patterned; and
    an interpenetrating network (IPN) hydrogel having one or more long-chain polymer networks and one or more reversibly crosslinked polymer networks which are mechanically dissipative components,
    wherein the IPN hydrogel directly bonds the at least one surface of the substrate that is non-porous and non-topographically patterned via chemical bonds that chemically anchor only the one or more long-chain polymer networks of the hydrogel, and
    wherein the IPN hydrogel is bonded with an interfacial toughness of over 300 J/m2.

2. The article of claim 1, wherein the one or more long-chain polymer networks interpenetrate the hydrogel.

3. The article of claim 2, wherein the one or more long-chain polymer networks are crosslinked.

4. The article of claim 1, wherein the IPN hydrogel includes chitosan, hyaluronan, or alginate.

5. The article of claim 2, wherein the one or more long-chain polymer networks include polyacrylamide or polyethylene glycol diacrylate.

6. The article of claim 1, wherein the substrate includes glass, silicon, ceramic, aluminum or titanium.

7. The article of claim 1, wherein the IPN hydrogel includes more than 90% of water.

8. The article of claim 1, wherein the IPN hydrogel is bonded with an interfacial toughness of over 1000 J/m2.

* * * * *